United States Patent
Esche et al.

(10) Patent No.: US 9,822,902 B2
(45) Date of Patent: Nov. 21, 2017

(54) SYSTEM AND METHOD TO DETECT AND COMMUNICATE FAUCET VALVE POSITION

(71) Applicant: Kohler Co., Kohler, WI (US)

(72) Inventors: John C. Esche, Kohler, WI (US); Chad J. Cochart, Sheboygan, WI (US)

(73) Assignee: KOHLER CO., Kohler, WI (US)

(*) Notice: Subject to any disclaimer, the term of this patent is extended or adjusted under 35 U.S.C. 154(b) by 0 days.

(21) Appl. No.: 14/791,009

(22) Filed: Jul. 2, 2015

(65) Prior Publication Data

US 2015/0308587 A1 Oct. 29, 2015

Related U.S. Application Data

(62) Division of application No. 13/794,631, filed on Mar. 11, 2013, now Pat. No. 9,074,698.

(60) Provisional application No. 61/692,966, filed on Aug. 24, 2012, provisional application No. 61/692,959, filed on Aug. 24, 2012, provisional application No. 61/692,912, filed on Aug. 24, 2012.

(51) Int. Cl.
| | |
|---|---|
| *E03C 1/05* | (2006.01) |
| *F16K 37/00* | (2006.01) |
| *F16K 11/00* | (2006.01) |
| *F16K 11/078* | (2006.01) |

(52) U.S. Cl.
CPC .......... *F16K 37/0041* (2013.01); *E03C 1/057* (2013.01); *F16K 11/078* (2013.01); *F16K 19/006* (2013.01); *F16K 37/00* (2013.01); *Y10T 137/8242* (2015.04)

(58) Field of Classification Search
CPC ............ E03C 1/057; E03C 2001/0415; F16K 19/006; F16K 31/05

USPC .......................................... 251/129.04; 4/623
See application file for complete search history.

(56) References Cited

U.S. PATENT DOCUMENTS

| | | | |
|---|---|---|---|
| 181,166 | A | 8/1876 | Haldeman et al. |
| 574,582 | A | 1/1897 | Smith |
| 815,746 | A | 3/1906 | Savage |
| 1,605,162 | A | 11/1926 | Borden |
| 1,892,544 | A | 12/1932 | Wanders |
| 1,927,780 | A | 9/1933 | Anderson |
| 1,968,957 | A | 8/1934 | Musgrave |

(Continued)

FOREIGN PATENT DOCUMENTS

| | | |
|---|---|---|
| CN | 2081024 U | 7/1991 |
| CN | 2641155 Y | 9/2004 |

(Continued)

OTHER PUBLICATIONS

Brizo Pascal, Obedient-Intelligent, brochure, 2007, 3 pages.

(Continued)

*Primary Examiner* — Matthew W Jellett
(74) *Attorney, Agent, or Firm* — Foley & Lardner LLP

(57) ABSTRACT

A faucet configured for touchless actuation that includes a spout; a mechanical valve configured to move between an open state and a closed state and having a member radially movable between an open position and a closed position in response to operation of the mechanical valve between the open state and the closed state; an electronic valve configured to move between an open state and a closed state; and a system configured to detect and communicate a state of the faucet in response to the position of the member.

20 Claims, 31 Drawing Sheets

(56) References Cited

U.S. PATENT DOCUMENTS

| | | | |
|---|---|---|---|
| 2,213,844 A | 9/1940 | Mantz | |
| 2,461,608 A | 2/1949 | Laing | |
| 2,642,109 A | 6/1953 | Hollerith | |
| 2,695,154 A | 11/1954 | Dillman | |
| 2,922,456 A | 1/1960 | Kann | |
| 2,948,317 A | 8/1960 | Munro | |
| 3,036,808 A | 5/1962 | Fox | |
| 3,221,794 A | 12/1965 | Acres | |
| 3,491,381 A | 1/1970 | Cathcart | |
| 3,576,277 A | 4/1971 | Blackmon | |
| 3,602,284 A | 8/1971 | Smith | |
| 4,052,035 A | 10/1977 | Kenny et al. | |
| 4,092,085 A | 5/1978 | McMaster-Christie | |
| 4,242,080 A | 12/1980 | Tabei | |
| 4,274,460 A | 6/1981 | Egner | |
| 4,466,261 A | 8/1984 | Zimmer | |
| 4,521,759 A | 6/1985 | Gibas | |
| 4,544,128 A | 10/1985 | Kolchinsky | |
| 4,679,017 A | 7/1987 | Mishler | |
| 4,735,357 A | 4/1988 | Gregory et al. | |
| 4,767,922 A | 8/1988 | Stauffer | |
| 4,871,989 A | 10/1989 | Gross | |
| 4,886,207 A | 12/1989 | Lee et al. | |
| 4,915,347 A | 4/1990 | Iqbal et al. | |
| 4,934,888 A | 6/1990 | Corsmeier | |
| 5,025,516 A | 6/1991 | Wilson | |
| 5,074,520 A | 12/1991 | Lee et al. | |
| 5,092,560 A | 3/1992 | Chen | |
| 5,095,941 A | 3/1992 | Betz | |
| 5,224,509 A | 7/1993 | Tanaka et al. | |
| 5,243,717 A | 9/1993 | Yasuo | |
| 5,287,570 A | 2/1994 | Peterson et al. | |
| 5,297,774 A | 3/1994 | Chuang | |
| 5,595,216 A | 1/1997 | Pilolla | |
| 5,755,262 A | 5/1998 | Pilolla | |
| 5,758,688 A | 6/1998 | Hamanaka et al. | |
| 5,842,679 A | 12/1998 | Kolchinsky | |
| 6,003,170 A | 12/1999 | Humpert et al. | |
| 6,067,673 A | 5/2000 | Paese et al. | |
| 6,109,288 A | 8/2000 | Al-Hamlan | |
| 6,202,980 B1 | 3/2001 | Vincent et al. | |
| 6,250,601 B1 | 6/2001 | Kolar et al. | |
| 6,310,530 B1 | 10/2001 | Jacobus | |
| 6,340,032 B1 | 1/2002 | Zosimadis | |
| 6,341,389 B2* | 1/2002 | Philipps-Liebich | E03C 1/05 251/129.04 |
| 6,363,549 B2 | 4/2002 | Humpert et al. | |
| RE37,888 E | 10/2002 | Cretu-Petra | |
| 6,612,540 B2 | 9/2003 | Bush | |
| D487,798 S | 3/2004 | Bayer | |
| 6,874,535 B2 | 4/2005 | Parsons et al. | |
| 7,000,637 B1 | 2/2006 | Kjaer | |
| 7,028,725 B2 | 4/2006 | Hooker | |
| 7,114,510 B2 | 10/2006 | Peters et al. | |
| 7,150,293 B2 | 12/2006 | Jonte | |
| 7,464,418 B2 | 12/2008 | Seggio et al. | |
| 7,472,433 B2 | 1/2009 | Rodenbeck et al. | |
| 7,533,697 B2 | 5/2009 | Zeiner | |
| 7,537,023 B2* | 5/2009 | Marty | E03C 1/055 116/277 |
| 7,624,757 B2 | 12/2009 | Schmitt | |
| 7,627,909 B2 | 12/2009 | Esche | |
| 7,743,438 B2 | 6/2010 | Chen | |
| 7,766,043 B2* | 8/2010 | Thomas | E03C 1/04 137/801 |
| 7,921,480 B2 | 4/2011 | Parsons et al. | |
| 8,104,113 B2 | 1/2012 | Rodenbeck et al. | |
| 8,118,240 B2 | 2/2012 | Rodenbeck et al. | |
| 2001/0011389 A1* | 8/2001 | Philipps-Liebich | E03C 1/05 4/623 |
| 2005/0253103 A1 | 11/2005 | Bente et al. | |
| 2006/0202142 A1 | 9/2006 | Marty et al. | |
| 2007/0246550 A1 | 10/2007 | Rodenbeck et al. | |
| 2008/0072965 A1 | 3/2008 | Buechel et al. | |
| 2008/0093572 A1 | 4/2008 | Wu | |
| 2009/0078896 A1 | 3/2009 | Clauss | |
| 2009/0119832 A1 | 5/2009 | Conroy | |
| 2011/0001069 A1 | 1/2011 | Zhang | |
| 2011/0139282 A1 | 6/2011 | Loeck et al. | |
| 2011/0185493 A1 | 8/2011 | Chen | |
| 2011/0186161 A1 | 8/2011 | Chen | |
| 2011/0210276 A1 | 9/2011 | Chen | |
| 2013/0248033 A1 | 9/2013 | Parikh et al. | |
| 2013/0248620 A1 | 9/2013 | Evans et al. | |
| 2013/0291978 A1 | 11/2013 | Baker et al. | |

FOREIGN PATENT DOCUMENTS

| | | |
|---|---|---|
| CN | 2641405 Y | 9/2004 |
| CN | 101135400 A | 3/2008 |
| DE | 1658243 | 9/1970 |
| DE | 19712 222 | 10/1997 |

OTHER PUBLICATIONS

Moen Introduces MotionSense: A Uniquely Responsive, User-Friendly, Hands-Free Kitchen Faucet Experience, Apr. 2012, 3 pages.

MotionSense, http://www.moen.com/about-moen/smart-innovations/motionsense, Apr. 2012, 2 pages.

International Search Report for Application No. PCT/US2010/058730, dated Jul. 3, 2011, 2 pages.

First Action Interview Pilot Program Pre-Interview Communication for U.S. Appl. No. 15/140,127 (dated Aug. 16, 2017).

* cited by examiner

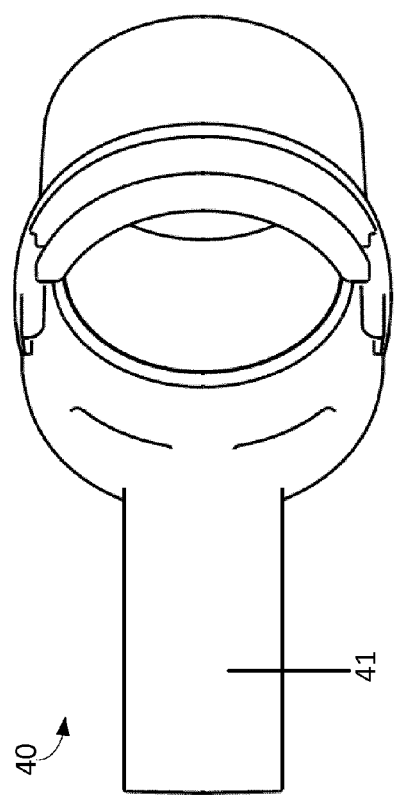
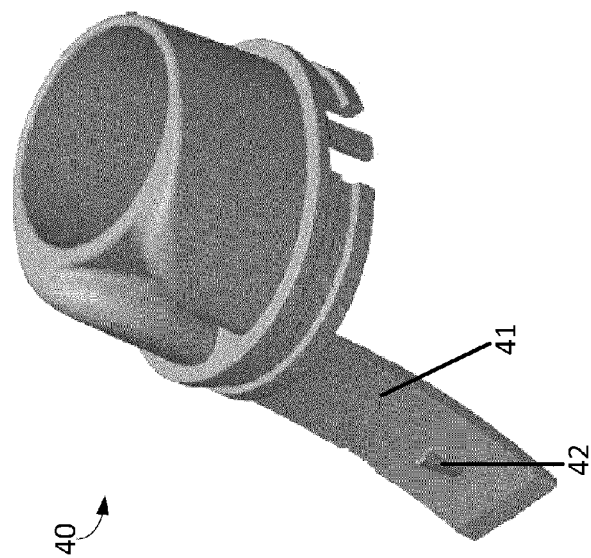

SYSTEM AND METHOD TO DETECT AND COMMUNICATE FAUCET VALVE POSITION

CROSS-REFERENCE TO RELATED PATENT APPLICATIONS

The present application is a Divisional of U.S. patent application Ser. No. 13/794,631, filed on Mar. 11, 2013, which claims the benefit of and priority to U.S. Provisional Patent Application No. 61/692,912, filed on Aug. 24, 2012; U.S. Provisional Patent Application No. 61/692,959, filed Aug. 24, 2012; and U.S. Provisional Patent Application No. 61/692,966, filed Aug. 24, 2012, all of which are incorporated by reference herein in their entireties.

TECHNICAL FIELD

The present application relates generally to the field of faucets. More specifically, the present application relates to systems and methods for detecting and communicating faucet valve position.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Some kitchen and bath faucets include a "touchless" control system. These touchless control systems may use magnetic, capacitive, or optical sensors to detect an object, such as a user's hands, underneath a faucet spout and, in response, to open or close a solenoid operated valve, thereby pausing and resuming fluid flow. Upstream from the solenoid operated valve, with respect to a direction of fluid flow from a fluid source to the faucet spout, a mechanical valve is provided. Regardless of the opened or closed position of the solenoid operated valve, fluid will not flow from the faucet spout unless the mechanical valve is in an open position.

In some touchless control systems, an LED is provided at a base of the faucet. The LED indicates if the touchless control system is active or inactive. However, since the LED does not communicate with the mechanical valve, the manual valve can be closed while the LED is on. Hence, a user that sees the LED in an on state will wave his or her hands underneath the faucet spout to resume fluid flow. However, if the mechanical valve is in the closed position, no fluid will flow from the faucet spout. The misleading LED signal miscommunicates an operational state of the faucet to the user and inconveniences the user.

A need exists for improved technology, including technology that allows an electronic system to detect and communicate a position of the manual valve to the touchless control system.

SUMMARY

An exemplary embodiment relates to a system for detecting and communicating a mechanical valve position in a faucet. The system includes a mechanical valve having an open state and a closed state, a control stem configured to selectively operate the valve between the open state and the closed state, a member movable between an open position and a closed position in response to operation of the mechanical valve between the open state and the closed state. The system further includes a ring disposed at least partially around the mechanical valve and having a switch disposed on the ring. Moving the member from the closed position to the open position actuates the switch. According to one embodiment, the member is radially movable between the open state and the closed state.

Another exemplary embodiment relates to a faucet configured for touchless actuation. The faucet includes a spout, a mechanical valve configured to move between an open state and a closed state and having a member radially movable between an open position and a closed position in response to operation of the mechanical valve between the open state and the closed state. The faucet further includes an electronic valve configured to move between an open state and a closed state and a system configured to detect and communicate a state of the faucet in response to the position of the member. According to one embodiment, the faucet further includes a sensor operatively coupled to the electronic valve, wherein triggering of the sensor causes the electronic valve to move between the open position to the closed position.

Another exemplary embodiment relates to a method for detecting and communicating a mechanical valve position in a faucet, the mechanical valve configured to selectively operate the valve between the open state and the closed state. A ring is provided at least partially around the mechanical valve. The ring has a switch disposed on one side of the ring and a screw disposed radially opposite the switch. A member coupled to the mechanical valve is aligned with the screw. The member is radially movable between an open position and a closed position in response to operation of the mechanical valve between the open state and the closed state. The screw adjusts a radial position of the ring relative to an exterior of the mechanical valve such that a radial movement of the member between the open position and the closed position actuates the switch.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The accompanying drawings, which are included to provide further understanding of the invention, are incorporated in and constitute a part of this specification, illustrate embodiments of the present disclosure, and together with the detailed description serve to explain the principles of the present disclosure. No attempt is made to show structural details of the present disclosure in more detail than may be necessary for a fundamental understanding of the present disclosure and the various ways in which it may be practiced.

FIG. 7 is a top view of a spray insert of the faucet of FIG. 1.

FIG. 8 is a bottom perspective view of the spray insert of FIG. 7, including a protrusion on a tab of the spray insert shown according to an exemplary embodiment.

DETAILED DESCRIPTION

Figure 1:
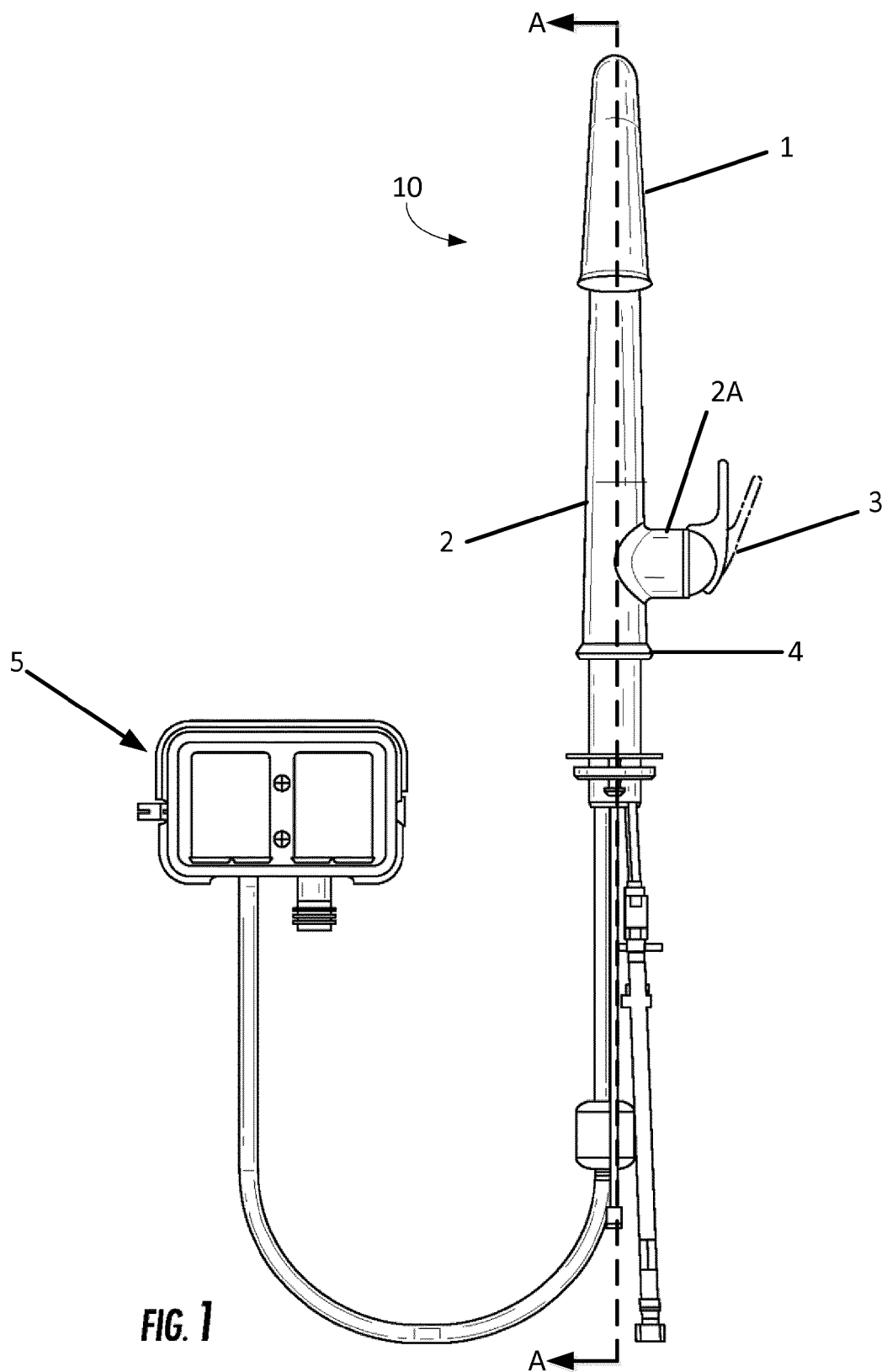
FIG. 1 is a front view of a faucet, shown according to an exemplary embodiment.

Before turning to the figures, which illustrate the exemplary embodiments in detail, it should be understood that the present disclosure is not limited to the details or methodology set forth in the description or illustrated in the figures. It should also be understood that the terminology is for the purpose of description only and should not be regarded as limiting. An effort has been made to use the same or like reference numbers throughout the drawings to refer to the same or like parts.

Referring generally to the figures, an exemplary embodiment may relate to a faucet including a sensor disposed within a faucet spout. The sensor, along with an electronic valve will allow the user to pause a flow of water from the faucet spout by engaging the sensor's field of detection. Flow will resume when the sensor's field of detection is engaged a second time. This configuration provides the user with a convenient, easy to use, touchless method of controlling the water flow. Moving the sensor internal to the spout provides a cleaner and aesthetically pleasing faucet profile; however, this configuration presents the added challenge of securing the sensor in the spout.

Referring generally to the figures, an exemplary embodiment may relate to a system for detecting and communicating a position of a mechanical valve in a faucet. The mechanical valve includes a valve channel configured to move between an open and a closed position. The system includes a switch configured to detect the position of the valve channel. The system further includes a ring located around the mechanical valve and configured to transfer motion of the valve channel to the switch. The system further includes an annunciator (e.g., an LED, LCD, audio, etc.) configured to indicate to a user the status of the mechanical valve position to a user and/or to an electronics system of the faucet.

Referring generally to the figures, an exemplary embodiment may relate to a manually-operated lifter configured to displace a sealing element off of a sealing surface by manual action in a faucet including a solenoid valve. In a touchless actuation system of a faucet, a sensor and an electronic valve, shown as a solenoid-operated valve, allow a user to pause a flow of water from the faucet spout by interrupting the sensor's field of detection. Flow will resume when the plane is broken a second time. In the event of a power failure, the solenoid-operated valve will default to a closed position, and the faucet will be rendered inoperable until power is resumed. The lifter allows a user to operate the faucet by manually moving the solenoid-operated valve from the closed position to an open position.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples). Accordingly, faucets having some or all of the features described above, or any combination or subcombination of the components and features described below, are contemplated within the scope of this disclosure.

Figure 10:
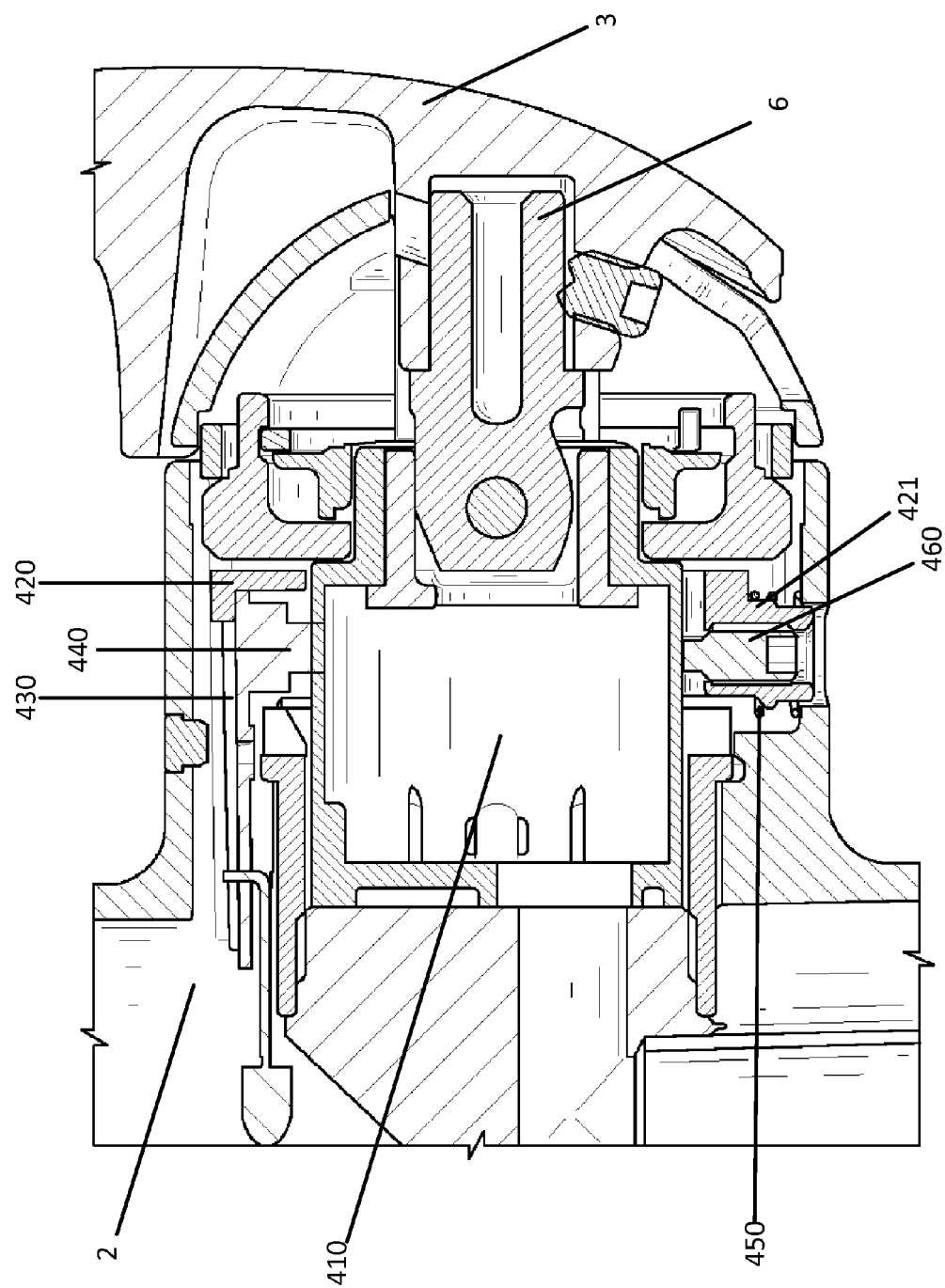
FIG. 10 is a front, cross-sectional elevation view of the system of FIG. 9.
Figure 11:
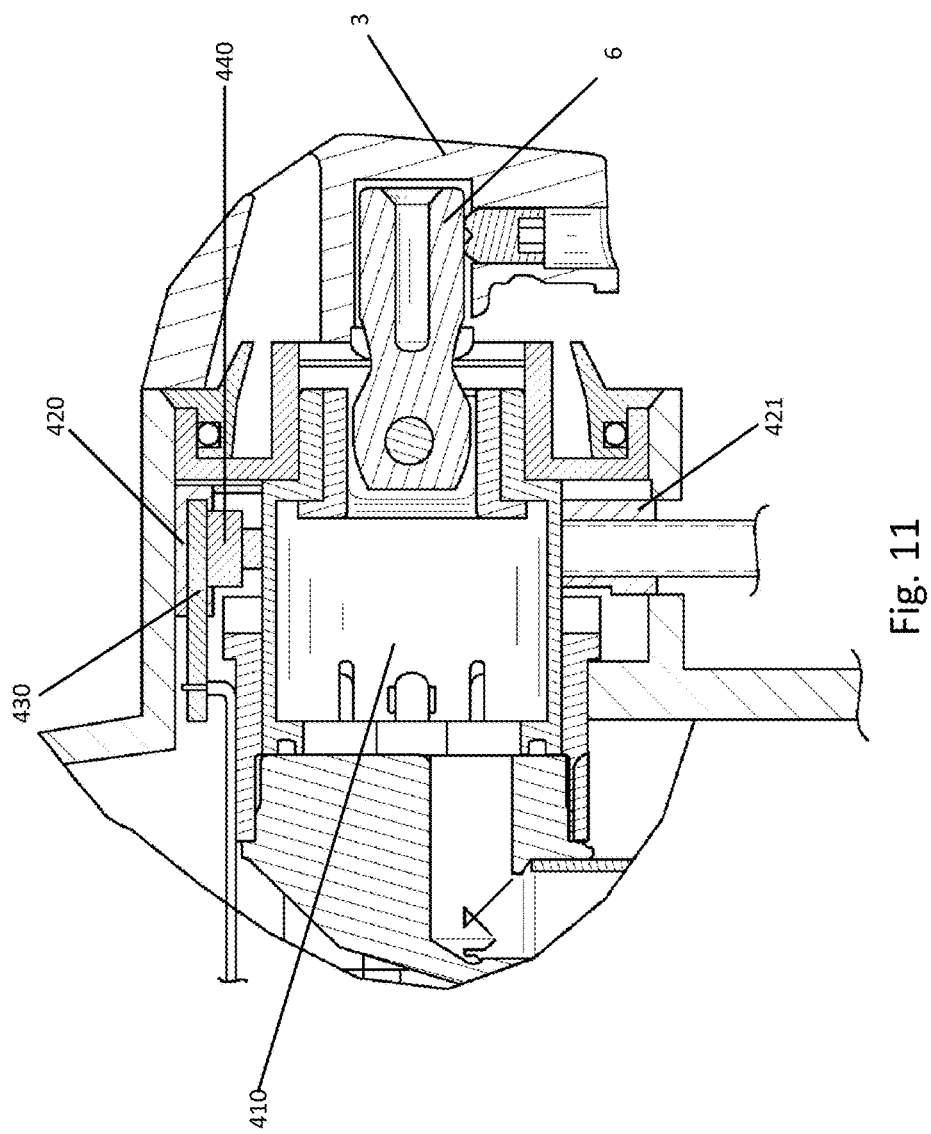
FIG. 11 is a front, cross-sectional elevation view of the system of FIG. 9, shown according to another exemplary embodiment.
Figure 12:
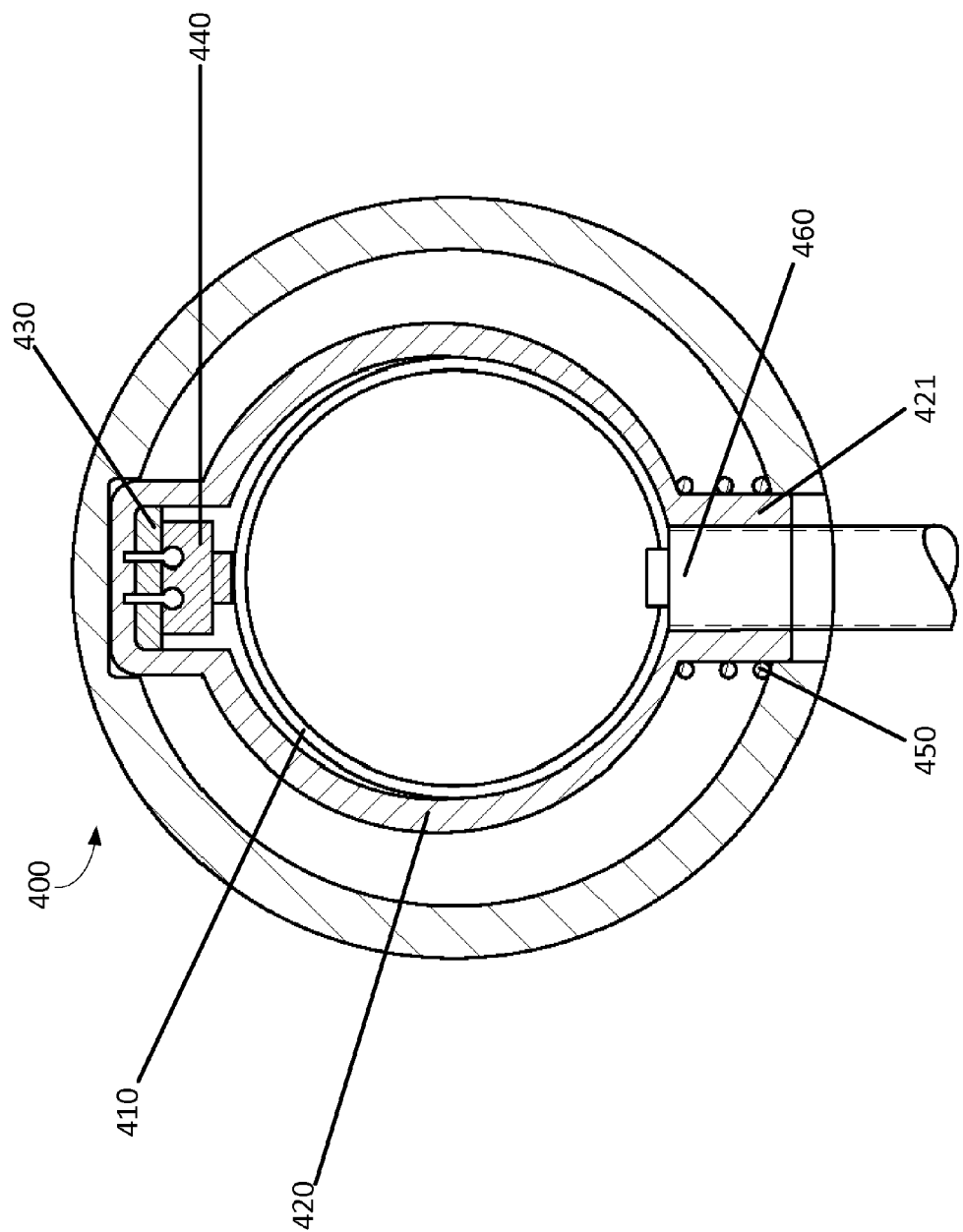
FIG. 12 is a right, cross-sectional, elevation view of the system of FIG. 9.

Referring to the figures more particularly, as illustrated in FIG. 1, an exemplary embodiment of a faucet 10 may include a faucet spout 1, a faucet body 2, a handle 3, a base 4 for mounting upon a surface (not shown), and an electronic valve system 5 configured to pause (e.g., interrupt, inhibit, prevent, stop, etc.) and resume (e.g., permit, allow, etc.) a flow of fluid (e.g., water). The faucet spout 1 has a first or outlet end 7, which defines an outlet 8 through which a fluid exits the faucet 10. The faucet spout 1 further includes a second or inlet end 9 at which the faucet spout 1 is coupled to the faucet body 2. In the exemplary embodiment, the handle 3 is operably coupled to a control stem 6 of a mechanical valve 410 (see, e.g., FIG. 10) that is fluidly coupled to the electronic valve system 5. The faucet body 2 may include a protruded portion 2A disposed approximately perpendicular to a longitudinal axis of the faucet body 2. The protruded portion 2A is shown to support the mechanical valve 410 and the handle 3 via the control stem 6.

The handle 3 is configured to at least partially control operation of the faucet 10. According to the exemplary embodiment shown, the handle 3 may be coupled, via the control stem 6, to a mechanical valve 410, which controls the flow of fluid from a fluid source to the electronic valve system 5. The mechanical valve 410, in response to manipulation of the handle 3, may mix incoming hot and cold fluids to output a fluid having a desired temperature. The mechanical valve 410 may be located upstream from the electronic valve system 5 with respect to a direction of fluid flow from a fluid source to the outlet 8. According to other embodiments, the mechanical valve may be downstream of the electronic valve system 5. When the handle 3 is in a first position (e.g., indicated by the solid line), the handle 3 is in a "non-operational" mode and fluid does not flow from the faucet spout 1. When the handle 3 is in a second position (e.g., indicated by the broken line), the handle 3 is in an "operational" mode and fluid flows through the mechanical valve to the electronic valve system 5 and, if the electronic valve 100, 200 is open and fluid is supplied to the faucet, then fluid flows from the outlet 8 of the faucet spout 1. In an exemplary embodiment, the mechanical valve 410 is disposed within the protruded portion 2A of the faucet body 2. In other embodiments, the mechanical valve 410 may be disposed in different locations, corresponding to the location of the handle 3.

Although in the illustrated exemplary embodiment, the handle 3 is mounted on a side of the faucet body 2, the handle 3 may be located in other positions, for example, on an opposite side of the faucet body 2 or along the surface (not illustrated) upon which the base 4 is mounted. This surface may be any surface including, but not limited to, a sink, a bathtub, shower wall, countertop, cabinet, appliance, etc. In an embodiment in which the handle 3 is located on the opposite side of the faucet body 2, the protruded portion 2A will also be located on the opposite side of the faucet body 2. In embodiments in which the handle 3 is located along the surface upon which the base 4 is mounted, or the handle 3 is mounted elsewhere on the faucet 10, the protruded portion 2A may be eliminated.

Figure 28:
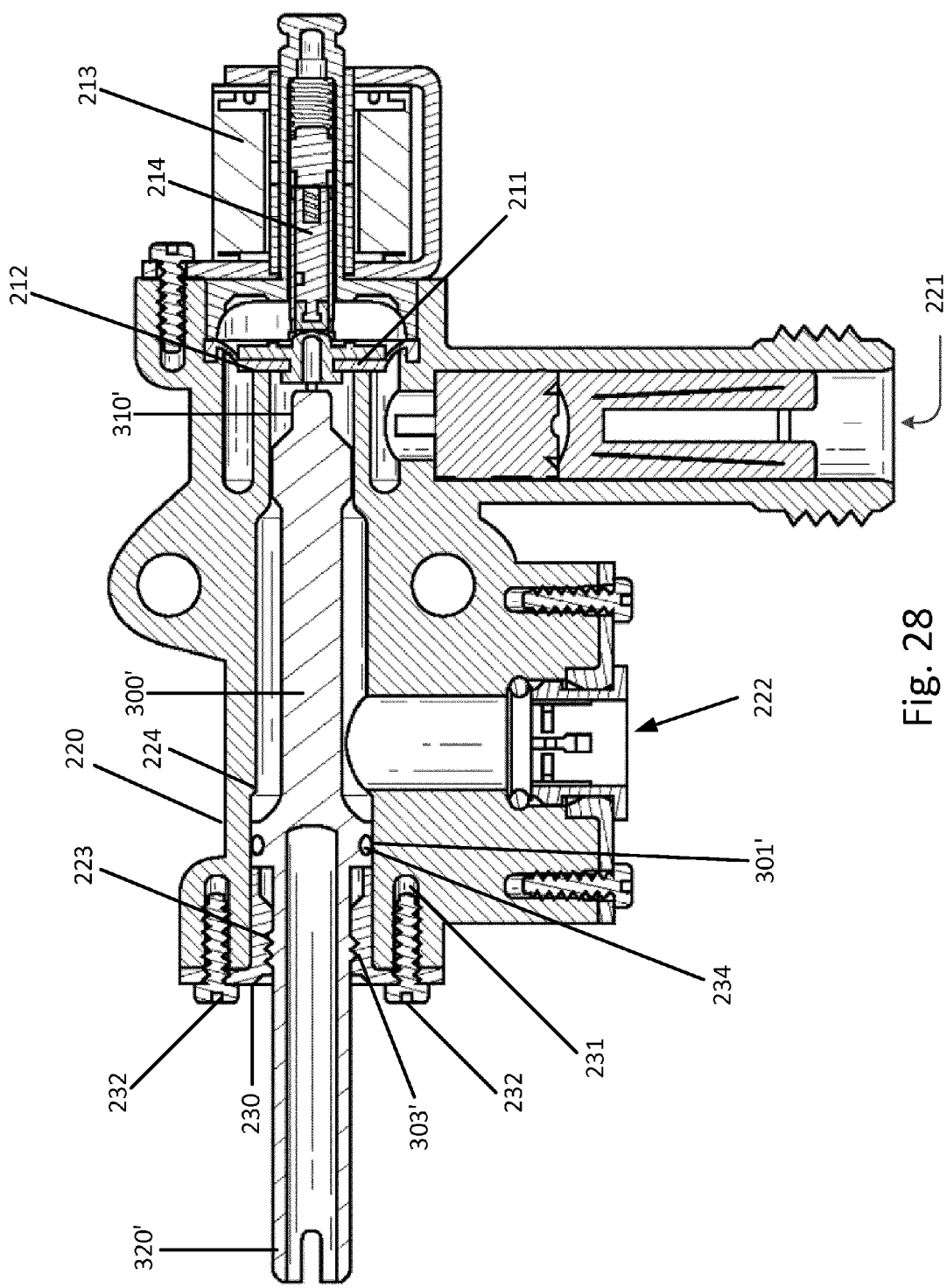
FIG. 28 is a front, cross-sectional elevation view of the electronic valve of FIG. 23 in a closed position during normal operation, shown according to another exemplary embodiment.
Figure 29:
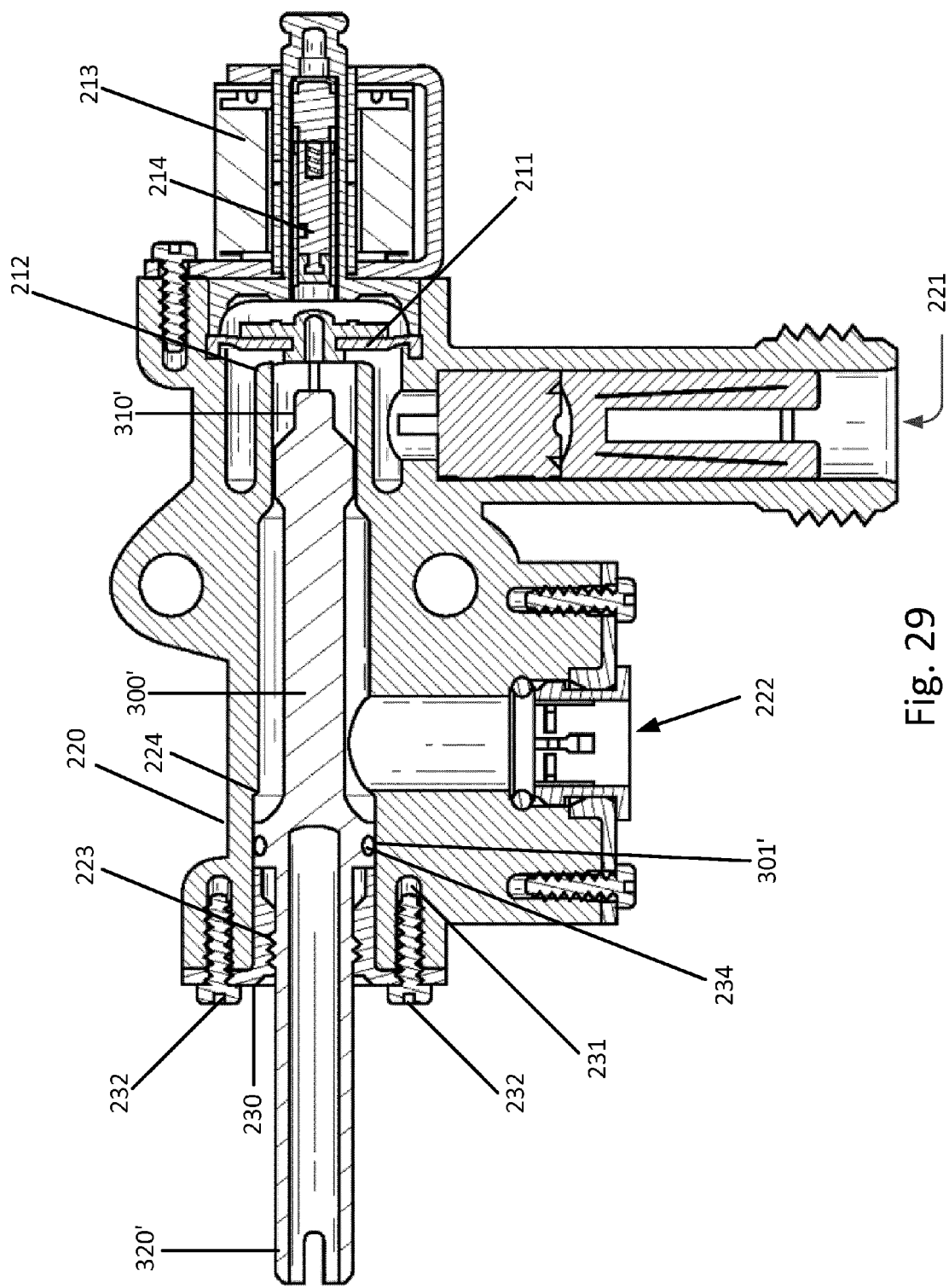
FIG. 29 is a front, cross-sectional elevation view of the electronic valve of FIG. 23 in an open position during normal operation, shown according to another exemplary embodiment.
Figure 30:
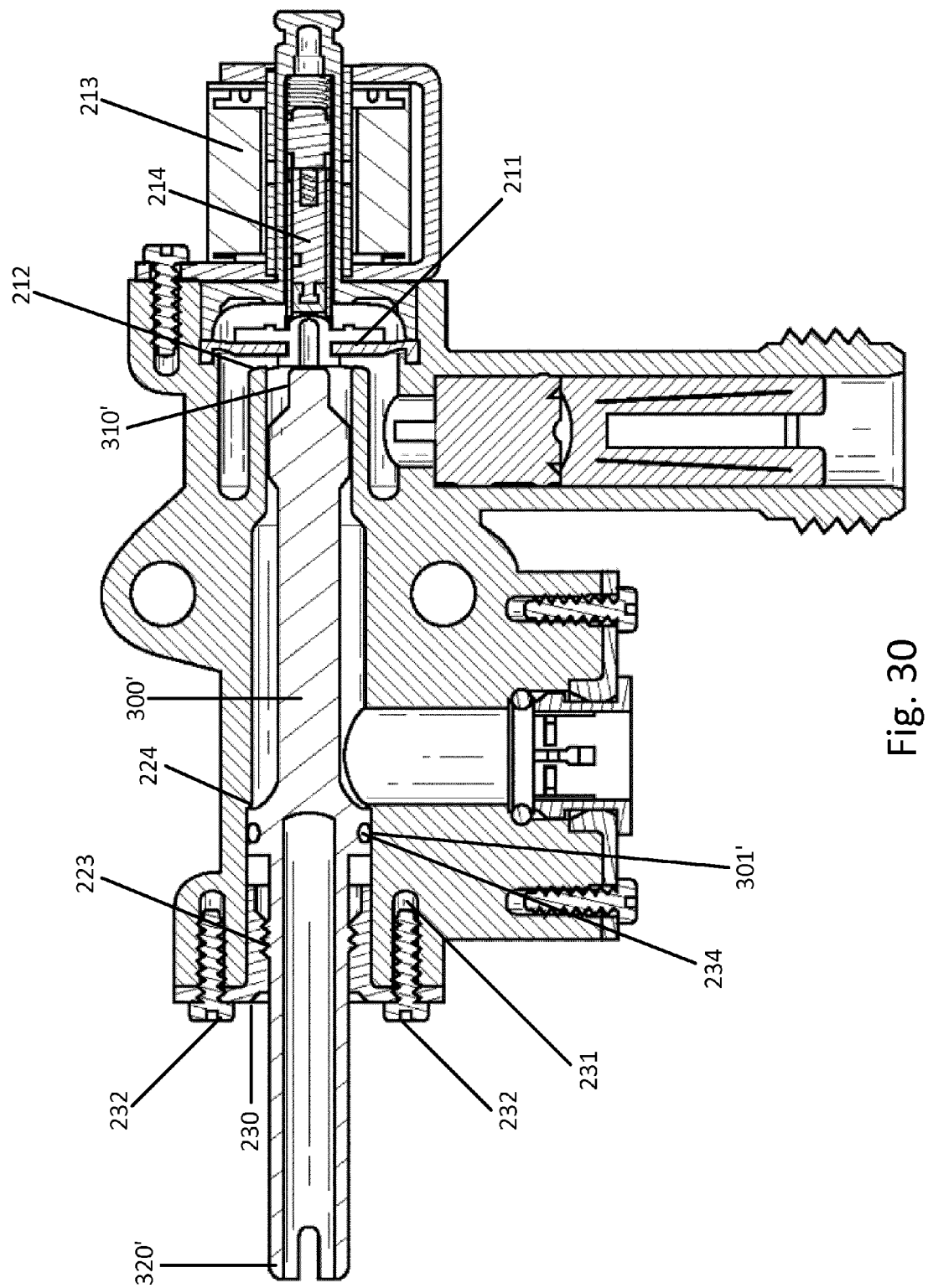
FIG. 30 is a front, cross-sectional elevation view of the electronic valve of FIG. 23 in an open position during override operation, shown according to another exemplary embodiment.

The electronic valve system 5 may pause and/or resume the flow of fluid in response to an open or a closed configuration of an electronic valve (e.g., electronically controlled valve, electromechanical valve, solenoid operated valve, etc.), shown as electronic valves 100, 200 (see FIGS. 28 and 29). According to the exemplary embodiment shown, the electronic valves 100, 200 include a solenoid. The electronic valve system 5 may also include any commercially available electronic valve and a sensor 20 disposed completely within, partially within or completely outside of the faucet spout 1 or faucet body 2. The electronic valve system 5 is in communication with the electronic valve 100, 200 and the sensor 20. In a preferred embodiment, the electronic valve is a normally closed solenoid such that in the event of a power failure the electronic valve closes and stops fluid flow. According to another embodiment, the electronic valve is a latching solenoid, which is held in an open or closed position by a magnet, and power is only required to switch between the open and closed positions. A latching solenoid requires less power to operate and, therefore, may be useful, for example, in a battery-operated electronic valve.

When the handle 3 is in the operational mode, a position of the electronic valve 100, 200 may pause or resume the flow of the fluid from the faucet spout 1. Specifically, when the electronic valve 100, 200 is in an open position, the fluid continues to flow from the faucet spout 1 when the handle 3 is in the operational mode. When the electronic valve 100, 200 is in a closed position, a flow of the fluid from the faucet spout 1 is paused, even if the handle 3 is in the operational mode. The open and closed positions of the electronic valve 100, 200 will be discussed in further detail below. When the handle 3 is in the non-operational mode, the fluid will not flow from the faucet spout 1 regardless of the position of the electronic valve 100, 200.

Referring briefly to FIGS. 19-25 and 28-30, exemplary embodiments of electronic valves 100, 200 are illustrated. The electronic valves 100, 200 are shown to include a solenoid portion 110, 210 and a valve body 120, 220. The solenoid portion 110, 210 includes, but is not limited to, a sealing element 111, 211, a sealing surface 112, 212, a solenoid coil 113, 213, and a plunger 114, 214. The sealing element 111, 211 may be, for example, a diaphragm, a poppet, etc. The sealing element 111, 211 may include a pilot vent hole (not illustrated) and a second vent hole (not illustrated). The valve body 120, 220 includes an inlet 121, 221 and an outlet 122, 222. Other components of the solenoid portion 110, 210 that may be present in the electronic valve 100, 200 may not be illustrated or may not be provided with reference numerals (e.g., a spring, gasket, an o-ring, etc.). The exemplary embodiments illustrated will be discussed in more detail below.

In normal operation, the electronic valve 100, 200 may be in the open position or the closed position. In an exemplary embodiment, when the electronic valve 100, 200 is in the closed position (see, e.g., FIG. 28), the solenoid coil 113, 213 does not produce a magnetic field. In this configuration, the pilot vent hole is blocked by the plunger 114, 214, causing inlet pressure to pass through the second vent hole and push the sealing element 111, 211 onto the sealing surface 112, 212. In other words, the sealing element 111, 211 abuts an entire length (e.g., an annular circumference) of the sealing surface 112, 212 preventing the flow of fluid through the electronic valve 100, 200. Because fluid cannot flow from the inlet 121, 221 of the valve body 120, 220 to the outlet 122, 222 of the valve body 120, 220, fluid is not provided to the outlet 8.

When the electronic valve 100, 200 is in the open position (see, e.g., FIG. 29), the solenoid coil 113, 213 produces a magnetic field that draws the plunger 114, 214 towards the solenoid coil 113, 213. When plunger 114, 214 moves towards the solenoid coil 113, 213, a vent hole opens, allowing the sealing element 111, 211 to move away from the sealing surface 112, 212. In this configuration, pressure that was holding the sealing element 111, 211 onto the sealing surface 112, 212 is reduced, allowing inlet pressure to push the sealing element 111, 211 off of the sealing surface 112, 212. As a result, the sealing element 111, 211 no longer abuts an entire length of the sealing surface 112, 212 and fluid may flow between the sealing element 111, 211 and the sealing surface 112, 212. Because fluid can flow from the inlet 121, 221 of the valve body 120, 220 to the outlet 122, 222 of the valve body 120, 220, fluid may be provided to the outlet 8 of the faucet spout 1, if the handle 3 is in the operational mode.

Figure 2:
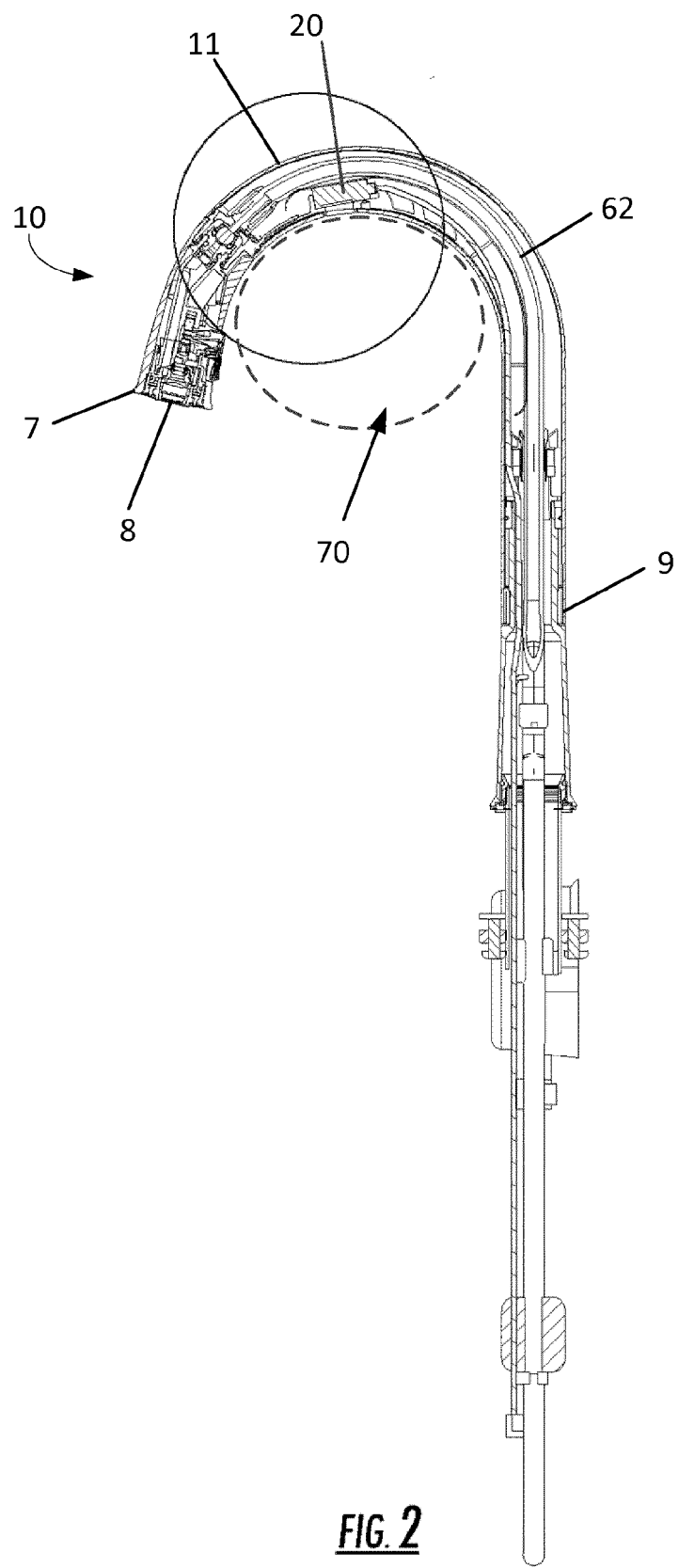
FIG. 2 is a right, cross-sectional view of the faucet of FIG. 1 through the line A-A.

Referring now to FIG. 2, the faucet 10 may include an internally mounted sensor, a sensor mounted to an underside of the faucet spout 1, and/or a sensor mounted proximate the apex of the faucet spout 1. A cross-sectional view of the faucet 10 through the line A-A of FIG. 1 is shown according to an exemplary embodiment. The faucet spout 1 has a first or outlet end 7 through which a fluid, for example, water, exits the faucet 10, and a second or inlet end 9 at which the faucet spout 1 is coupled to the faucet body 2. In between the outlet end 7 and the inlet end 9, the faucet spout 1 is shown to have a seamless sidewall 11 that extends along a curved longitudinal axis. The sidewall 11 defines an opening 13 along an underside of the faucet spout 1 proximate the zenith or apex of the faucet spout 1. As shown, the proximity of the opening 13 to the zenith of the underside of the faucet spout 1 causes the opening to be substantially horizontal. As further shown, the opening 13 may be slightly towards the outlet end 7 of the spout. In the illustrated exemplary embodiment, the opening 13 is formed as a punched opening. In alternative embodiments, the opening 13 may be machined or fabricated by any suitable method, for example, casting, cutting drilling, etc. The opening 13 may be covered by a transparent material such as glass or plastic.

A sensor 20 may be disposed completely within the faucet spout 1 along a curved portion of the sidewall 11 between the outlet end 7 and the inlet end 9 of the faucet spout 1. The sensor 20 is disposed adjacent to the opening 13 of the faucet spout 1. The sensor 20 may be any commercially available sensor of suitable size (i.e., a size capable of fitting inside of the faucet spout 1). The sensor 20 may be selected, based in part, on factors such as a desired sensitivity, amount of power required to operate the sensor 20, and cost considerations. For example, the sensor 20 may be configured such that the sensor 20 only detects (e.g., emits a signal in response to) objects within a predefined range. According to various embodiments, the range is less than 12 inches (30 cm), less than 10 inches (25 cm), or less than 8 inches (20 cm). According to an exemplary embodiment, the predefined range is less than 6 inches (15 cm). Reducing the sensitivity or range of the sensor allows a detection range (see, e.g., field of detection 70, shown in FIG. 2, detection region, etc.) to be defined that does not intersect the flow of fluid from the faucet spout 1 or the work region in or around the sink, thereby reducing accidental triggering of the sensor. The sensor 20 is operatively connected to the electronic valve 100, 200, e.g., wirelessly or via a wire 21 extending from the sensor 20 to the electronic valve system 5. In some embodiments, the sensor 20 may be a receiver, discrete from or spaced apart from an emitter (e.g., transmitter, etc.). In other embodiments, the sensor 20 may be a receiver proximate or coupled to a transmitter. In other embodiments, the sensor 20 may be an emitter. In the exemplary embodiment shown, the sensor 20 includes both an emitter portion and a receiver portion.

Referring now to FIGS. 3-6, a sensor holder 30 configured to position and retain the sensor 20 in the faucet spout 1 may be provided in the faucet 10. The sensor holder 30 may be formed of any material including, but not limited to, plastic or metal. In a preferred embodiment, the sensor holder 30 is formed of plastic for cost considerations and characteristics such as moldability, durability, and corrosion resistance.

The sensor holder 30 includes a frame 31 configured to secure the sensor 20. The frame 31 has a front end 31A extending toward the outlet end 7 of the faucet spout 1 and a back end 31B extending toward the inlet end 9 of the faucet spout 1. A raised window 32 is disposed along and through a bottom or underside of the frame 31. The raised window 32 is configured to engage the opening 13 of the faucet spout 1. As shown, when the raised window 32 is positioned in the opening 13, the sensor holder 30 is oriented in a substantially horizontal direction along a longitudinal axis of the spout proximate an apex of the spout and inhibits a horizontal motion of the sensor holder 30.

Figure 4:
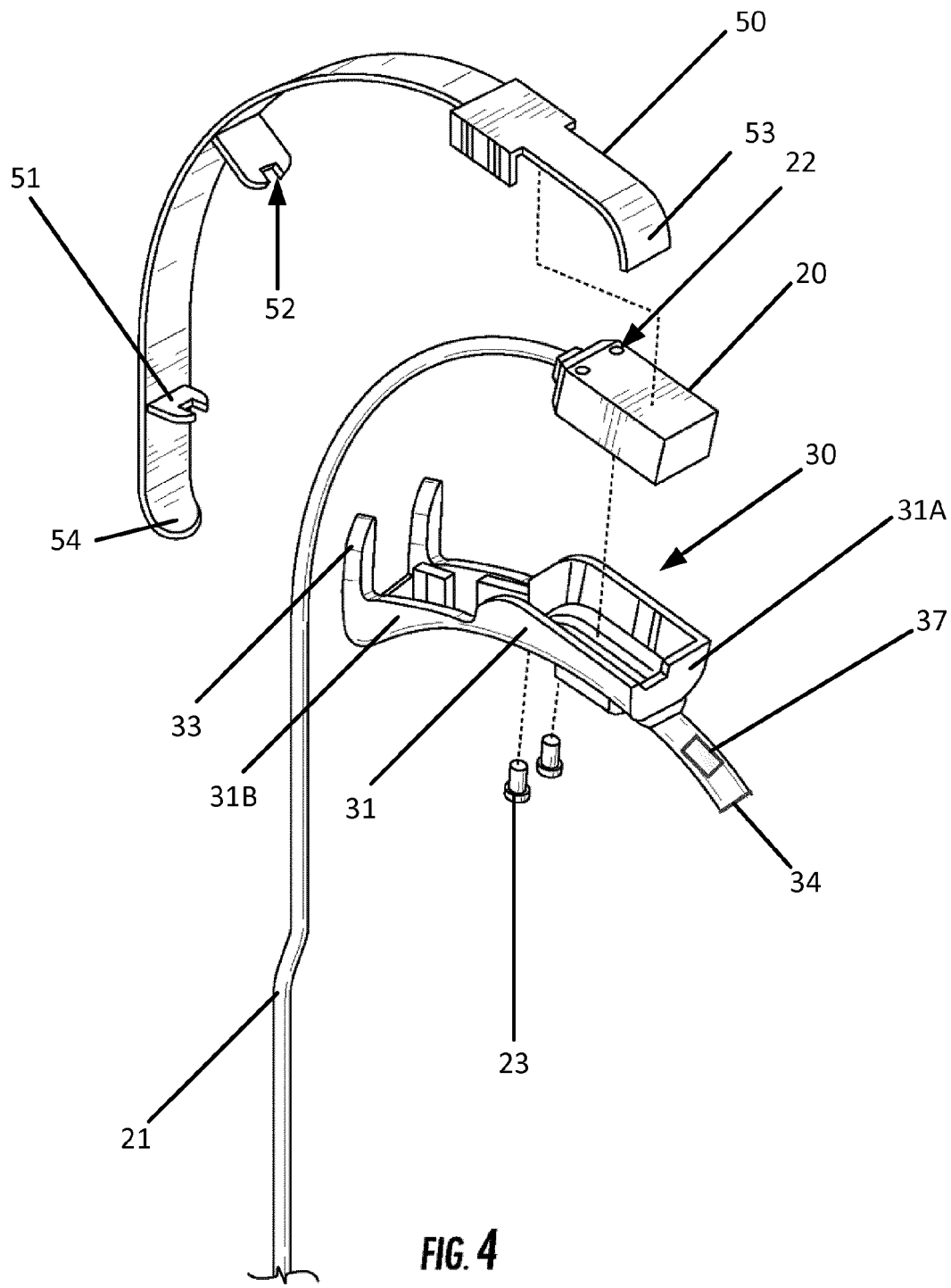
FIG. 4 is an exploded view of a sensor, a sensor holder, and a wire cover disposed within the faucet of FIG. 1.
Figure 5:
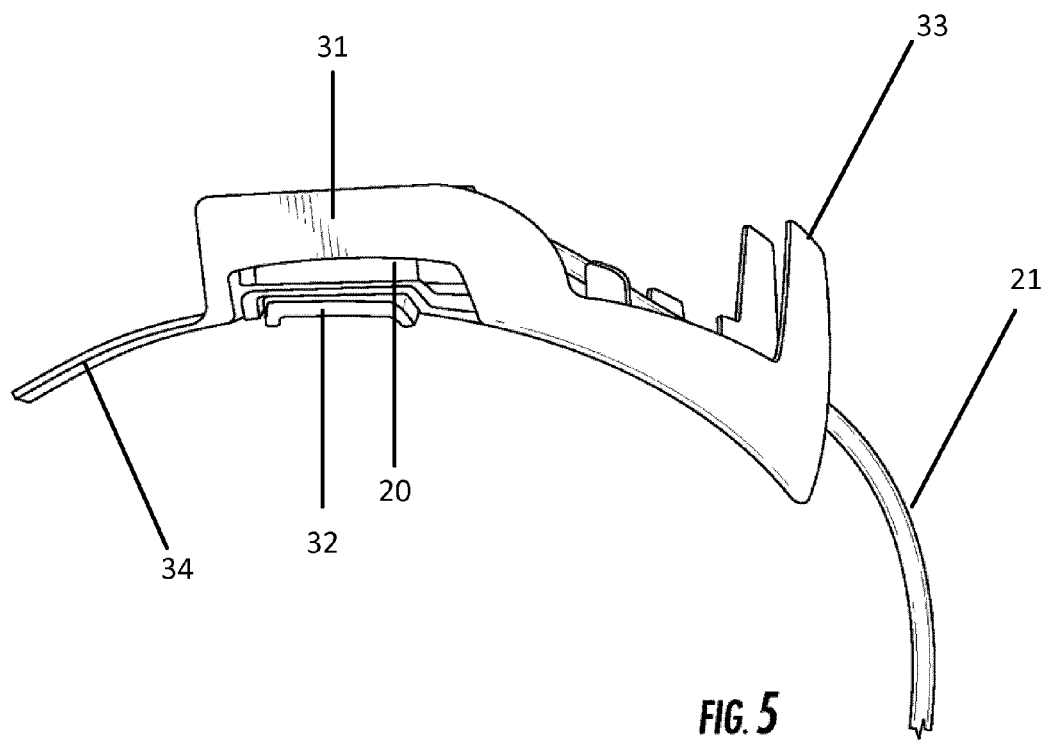
FIG. 5 is a right elevation view of the sensor and the sensor holder of FIG. 4.
Figure 6:
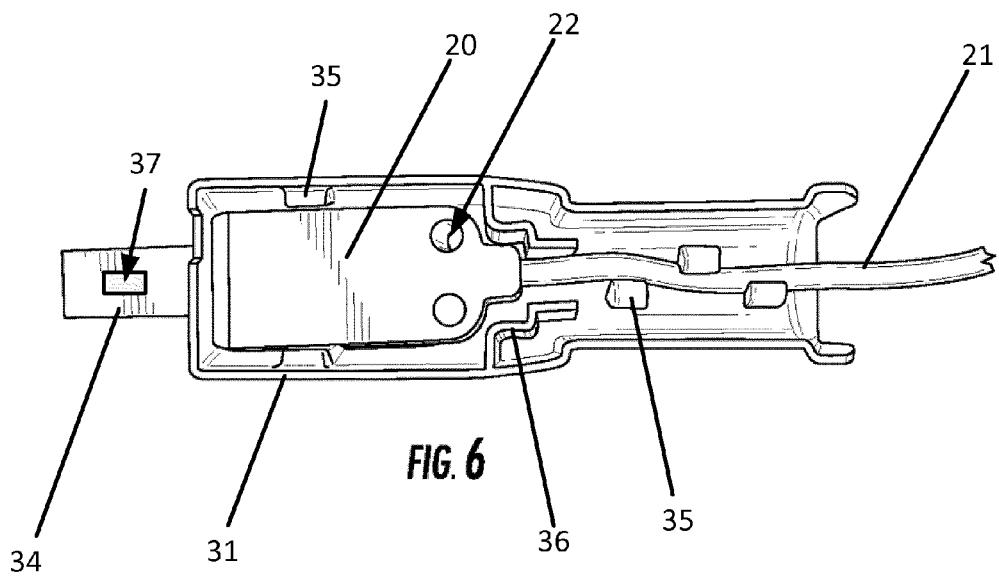
FIG. 6 is a top plan view of the sensor and the sensor holder of FIG. 4.

The sensor holder 30 also includes at least one leg 33 disposed at the back end 31B of the frame 31 and extending in a substantially vertical direction (e.g., substantially transverse or substantially perpendicular to a longitudinal axis of the sensor holder 30). As illustrated in FIGS. 4-6, an exemplary embodiment of the sensor holder 30 includes two legs 33. In other embodiments, a different number of legs 33 can be used, for example, one, three, four, etc. The legs 33 are configured to keep the back end 31B of the frame 31 in either an up position (not illustrated) or a down position (see FIG. 3) to inhibit a vertical motion of the sensor holder 30 and thus, securing the sensor 20 within the sensor holder 30. When in the down position, the raised window 32 may engage with the horizontal opening 13 in the faucet spout 1.

Figure 3:
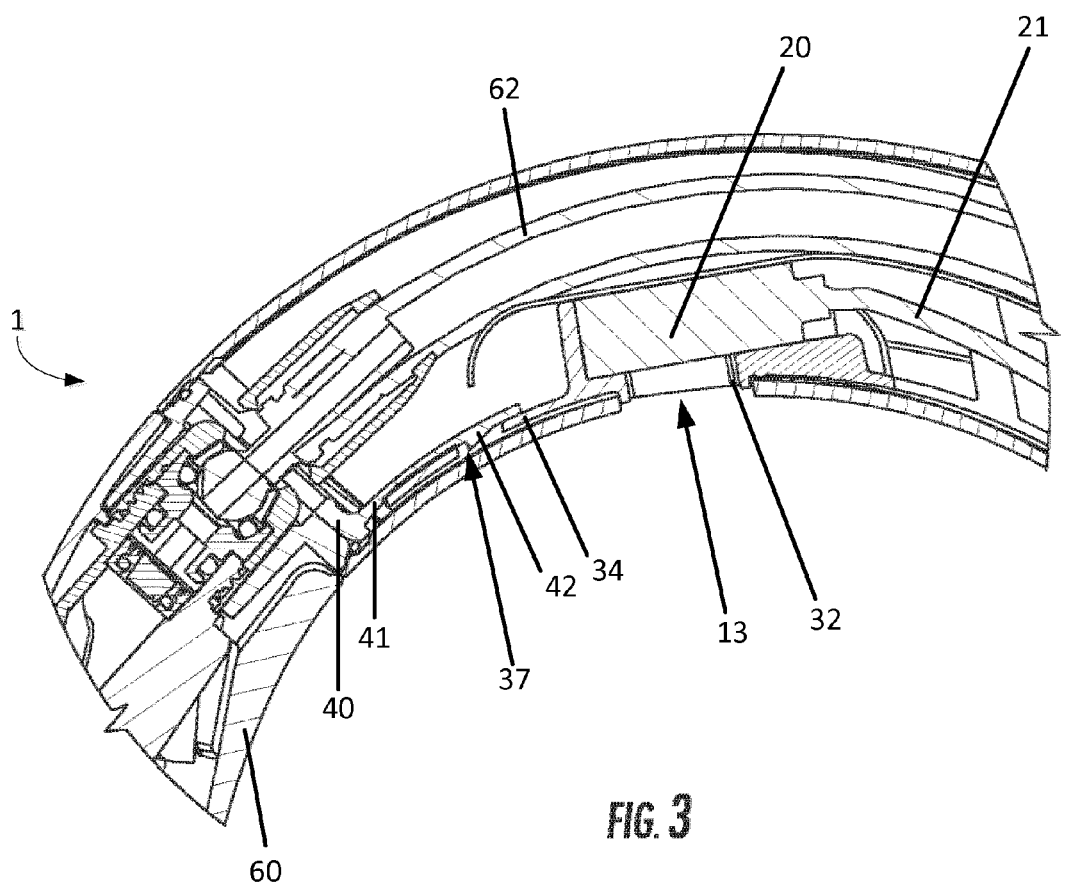
FIG. 3 is an enlarged partial view of the solid-circled area of the faucet of FIG. 2.

As shown in FIGS. 2 and 3, the sensor holder 30 holds the sensor 20 in position over the opening 13. The sensor 20 is held in a position slightly forward (e.g., toward a user when the faucet 10 is in an installed position) of the apex such that a light beam emitted from the sensor 20 passes through the opening 13 in the faucet spout 1, and propagates downward and generally rearward. Accordingly, the light beam is directed away from fluid exiting the faucet spout 1 at the outlet end 7, thereby reducing the possibility of inadvertent or accidental triggering of the sensor 20. According to various embodiments, the light beam may be directed towards the faucet body 2, a portion of the deck to which the faucet 10 is mounted in front of the faucet 10, or rear wall of the sink basin. According to the exemplary embodiment shown, a user wishing to pause or resume the flow of fluid may wave a hand or object in a detection region under the faucet spout 1, behind the flow of water, thereby reflecting the beam of light back to the sensor 20. As shown in FIG. 2, the field of detection 70 (e.g., detection zone, detection region, etc.) may be substantially defined by an underside of the faucet spout 1 above the outlet end 7 of the faucet spout 1. According to another embodiment, a receiver may be located remotely from the sensor 20, for example, on the faucet body 2 or another part of the faucet spout 1, and a user wishing to pause or resume the flow of fluid may wave a hand or object in a detection region under the faucet spout 1, behind the flow of water, thereby blocking the beam of light from reaching the receiver.

The sensor holder 30 further includes a forward tab 34 extending from the front end 31A of the frame 31. The forward tab 34 is held in place by a corresponding tab extending from a spray insert 40. In a preferred embodiment, the forward tab 34 includes a slot 37. However, the slot 37 is not required. In a preferred embodiment, the spray insert 40 includes a tab 41 (see FIGS. 7-8). The tab 41 includes a substantially wedge-shaped protrusion 42. However, the protrusion 42 may be any other suitable shape. The slot 37 and the protrusion 42 engage (see FIG. 3) and are configured to prevent the sensor holder 30 from being inadvertently pushed further into and down the faucet spout 1. A vertical motion of the sensor holder 30 is inhibited by the legs 33 and the forward tab 34. According to another embodiment, the spray insert may include a tab and the sensor holder may include a corresponding slot.

The sensor 20 may be secured to the sensor holder 30 in a variety of ways. In an exemplary embodiment, the sensor holder 30 may be overmolded onto the sensor 20. In another exemplary embodiment, the sensor 20 may include a plurality of holes 22 and the frame 31 may include a plurality of holes (not illustrated) corresponding to a number of holes 22 disposed in the sensor 20. The plurality of holes 22 disposed in the sensor 20 and the plurality of holes disposed in the frame 31 are configured to align. In this embodiment, the sensor 20 is secured to the sensor holder 30 via a plurality of screws 23 that connect the sensor 20 and the sensor holder 30 via the plurality of holes 22 disposed in the sensor 20 and the plurality of holes disposed in the frame 31. According to another embodiment, the sensor holder 30 may include a plurality of protrusions or bosses (not illustrated) that align with and are received in the plurality of holes 22, thereby retaining the sensor 20 relative to the sensor holder 30.

Referring now to FIG. 6, the frame 31 of the sensor holder 30 may further include a plurality of projections 35 configured to engage with and further secure the sensor 20 and the wire 21 to the frame 31. In addition, the frame 31 may include interior walls 36 having a contour corresponding to a perimeter of an area in which the sensor 20 connects to the wire 21.

In another embodiment, the faucet 10 does not include the sensor holder 30. Instead, the sensor 20 is held in place by fasteners, for example, screws, pins, plugs, clips, "Christmas trees," etc. For example, one fastener may be positioned at a forward or front end of the sensor 20 and another fastener may be positioned rearward or aft of the sensor 20. However, due to a curvature of the faucet spout 1, it may be difficult to drill or punch holes for the screws. Specifically, an inner curve of the faucet spout 1 tends to prevent a typical drill or punch from aligning perpendicularly to an inside of the inner curve of the faucet spout 1. Thus, the sensor 20 might not be held in place by screws unless a right angle drill or a cam driven punch were utilized. Employing a sensor holder 30, as described in the preferred embodiments, is intended to eliminate these problems.

In the embodiment shown, the faucet 10 may include a detachable or pull-out spray head 60 configured to direct a spray of fluid to a specific location. In this configuration, fluid moves through a hose passing within the faucet spout 1 and exits the faucet 10 through the spray head 60. In such embodiments in which a spray head 60 is provided, the faucet 10 may include a wire cover 50 configured to protect the wire 21 connecting the sensor 20 to the electronic valve 100, 200 from abrasion as the hose 62 travels through the faucet spout 1 as the spray head 60 is pulled out from and returned to the faucet spout 1. In addition, the wire cover 50 protects the hose from abrasion that may result from contact with the sensor holder 30 and sensor 20. The wire cover 50 may include a plurality of projections 51 disposed along a length of the wire cover 50. Each projection 51 contains a recessed portion 52 configured to receive and secure to the wire 21. The forward and rearward ends 53, 54 of the wire cover 50 are curved to provide a ramp that guides the hose 62 over the wire cover 50.

Figure 9:
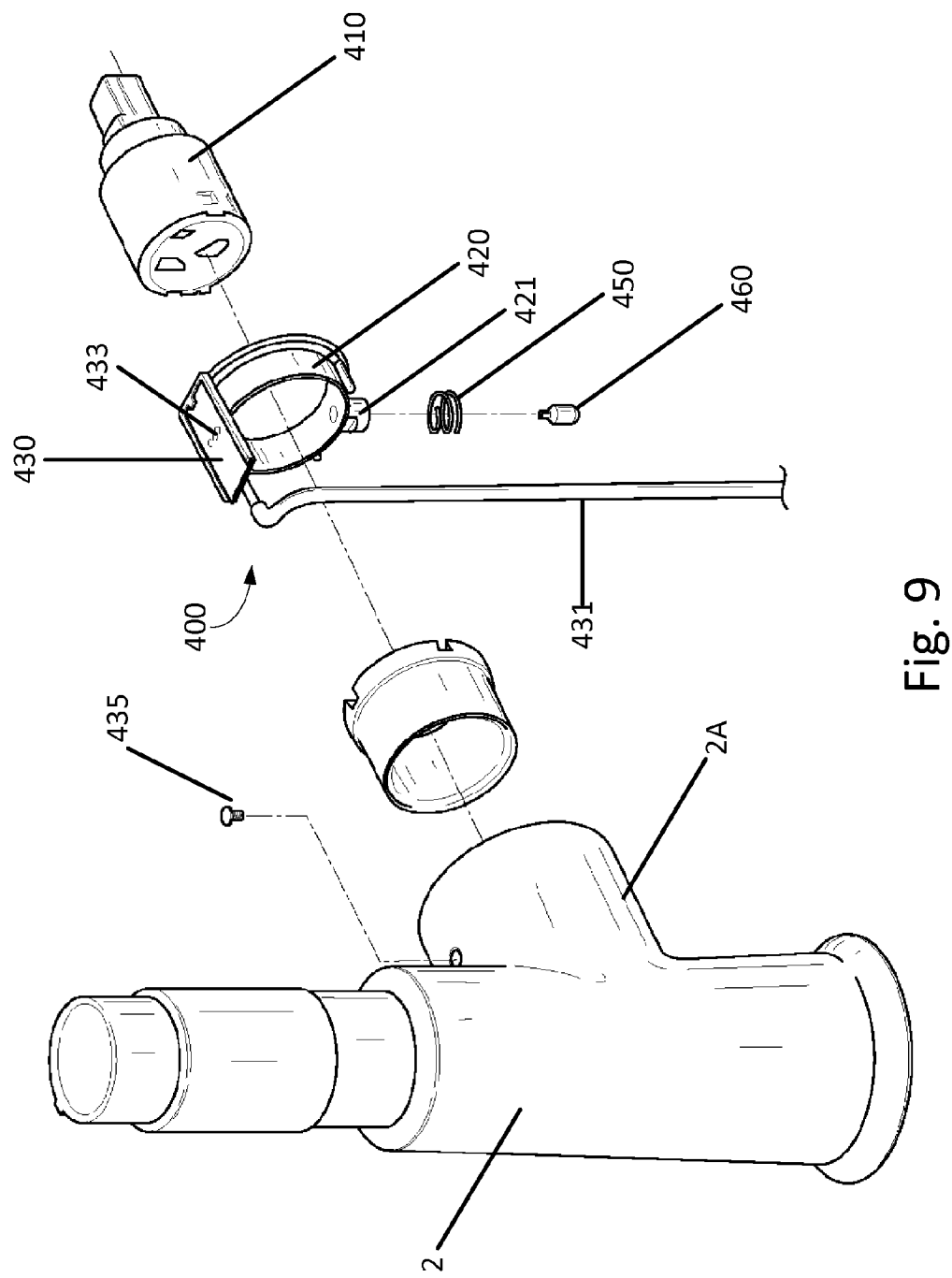
FIG. 9 is an exploded view of a system for detecting and communicating a position of a manual valve of the faucet of FIG. 1, shown according to an exemplary embodiment.

Referring now to FIG. 9, the faucet 10 may further include a system for detecting and communicating a position of a mechanical valve in a faucet. An exploded view of a system 400 for detecting and communicating the position of the mechanical valve 410 is shown, according to an exemplary embodiment. The system 400 includes a ring 420, a mounting surface 430, a switch 440 (shown in FIGS. 10-14), a balancing spring 450, and an adjustment screw 460. In the exemplary embodiment shown, the mounting surface 430 is a circuit board. According to one embodiment, the system 400 is a subsystem of the electronic valve system 5.

Figure 13:
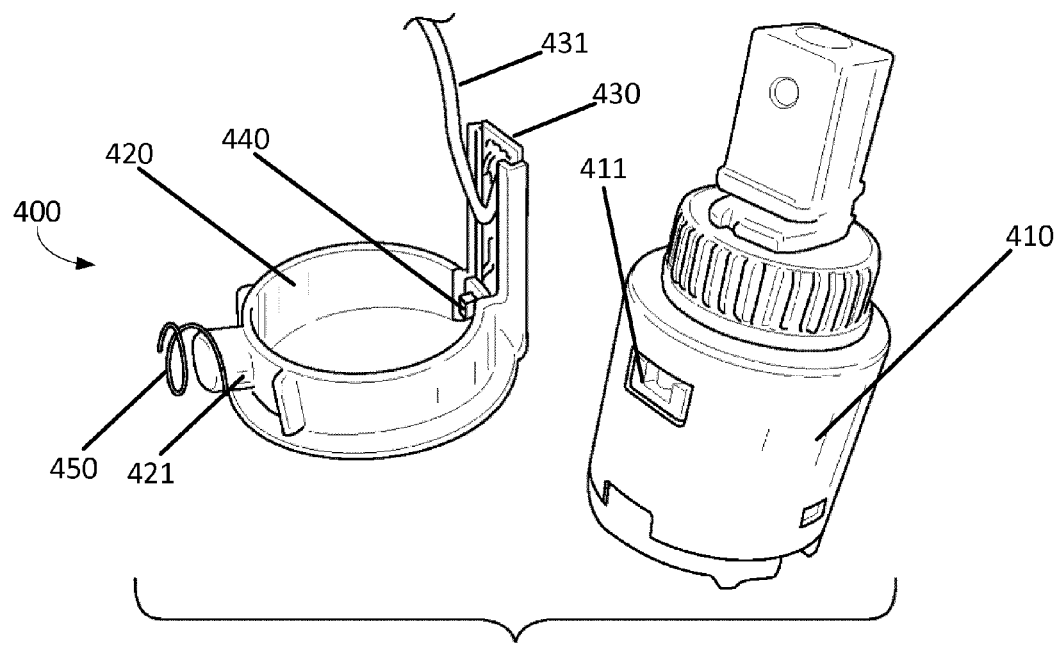
FIG. 13 is a perspective view of a manual valve and a ring of the system of FIG. 9 with a closed valve channel, according to an exemplary embodiment.
Figure 14:
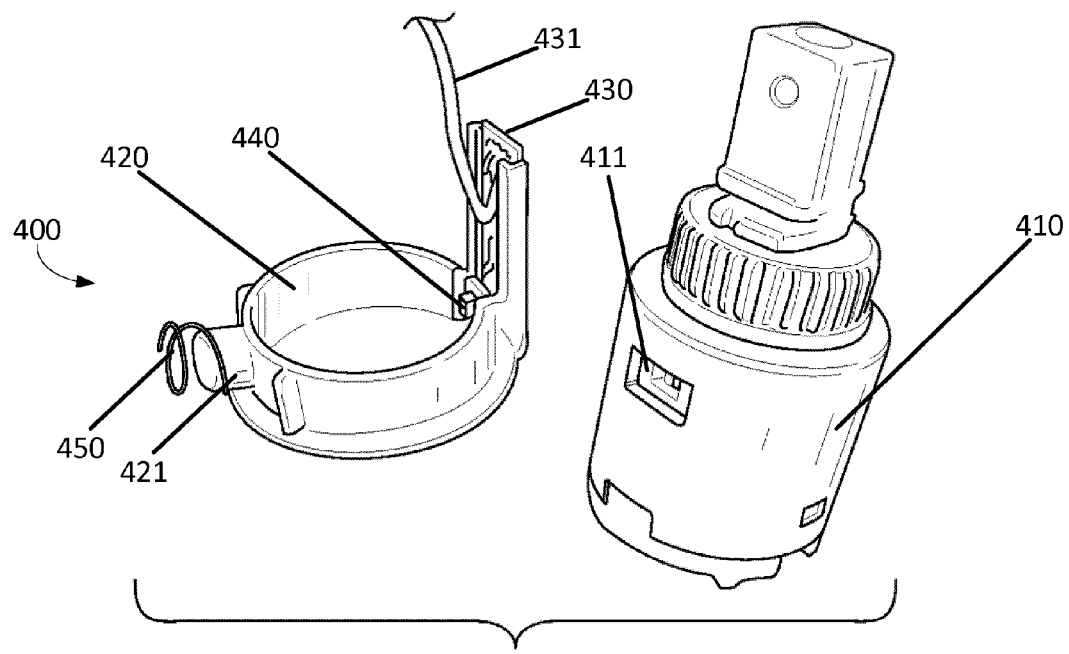
FIG. 14 is a perspective view of a manual valve and a ring of the system of FIG. 9 with an open valve channel, according to an exemplary embodiment.
Figure 15:
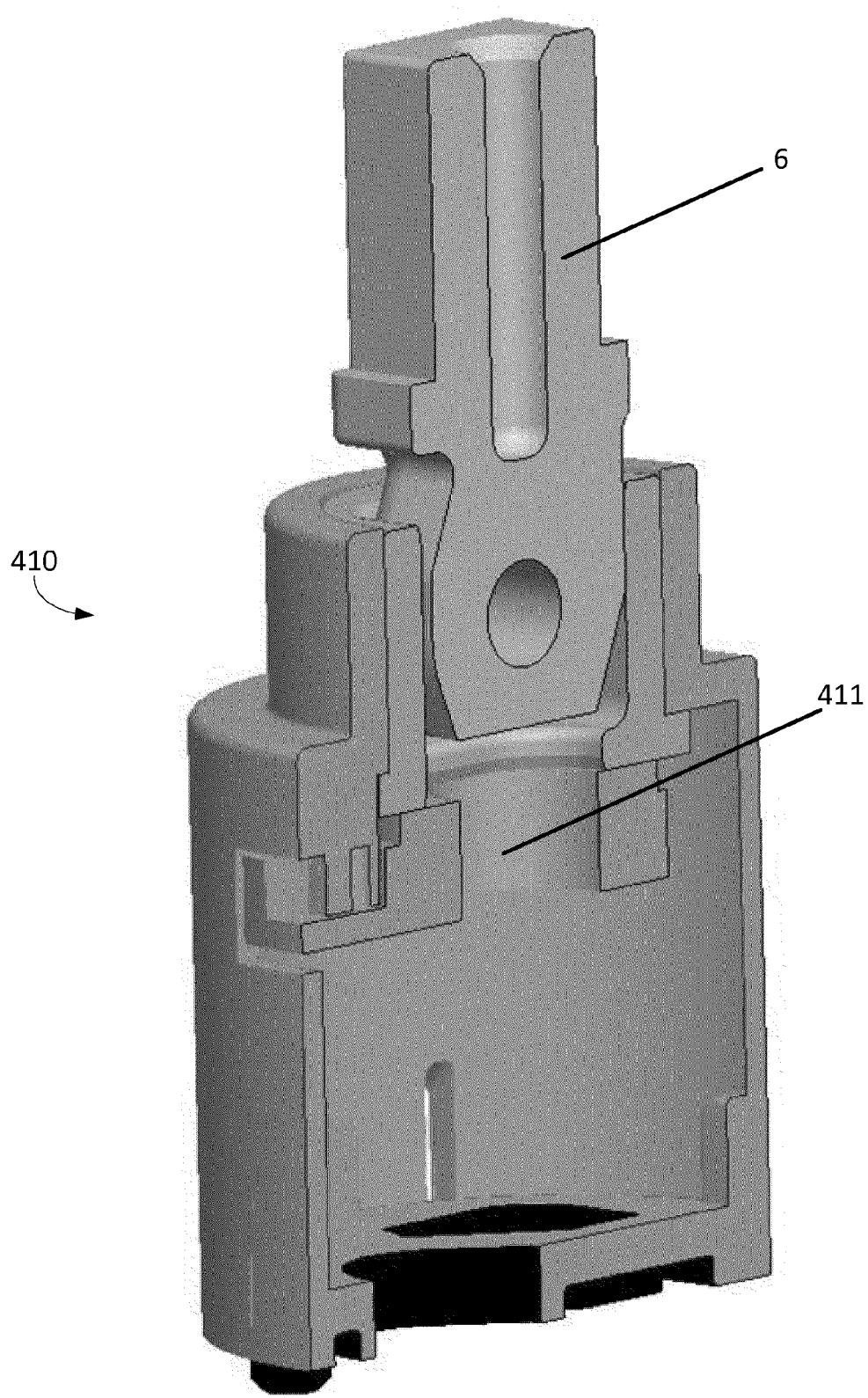
FIG. 15 is a perspective, cross sectional view of the manual valve of FIG. 13 with a closed valve channel, according to an exemplary embodiment.
Figure 16:
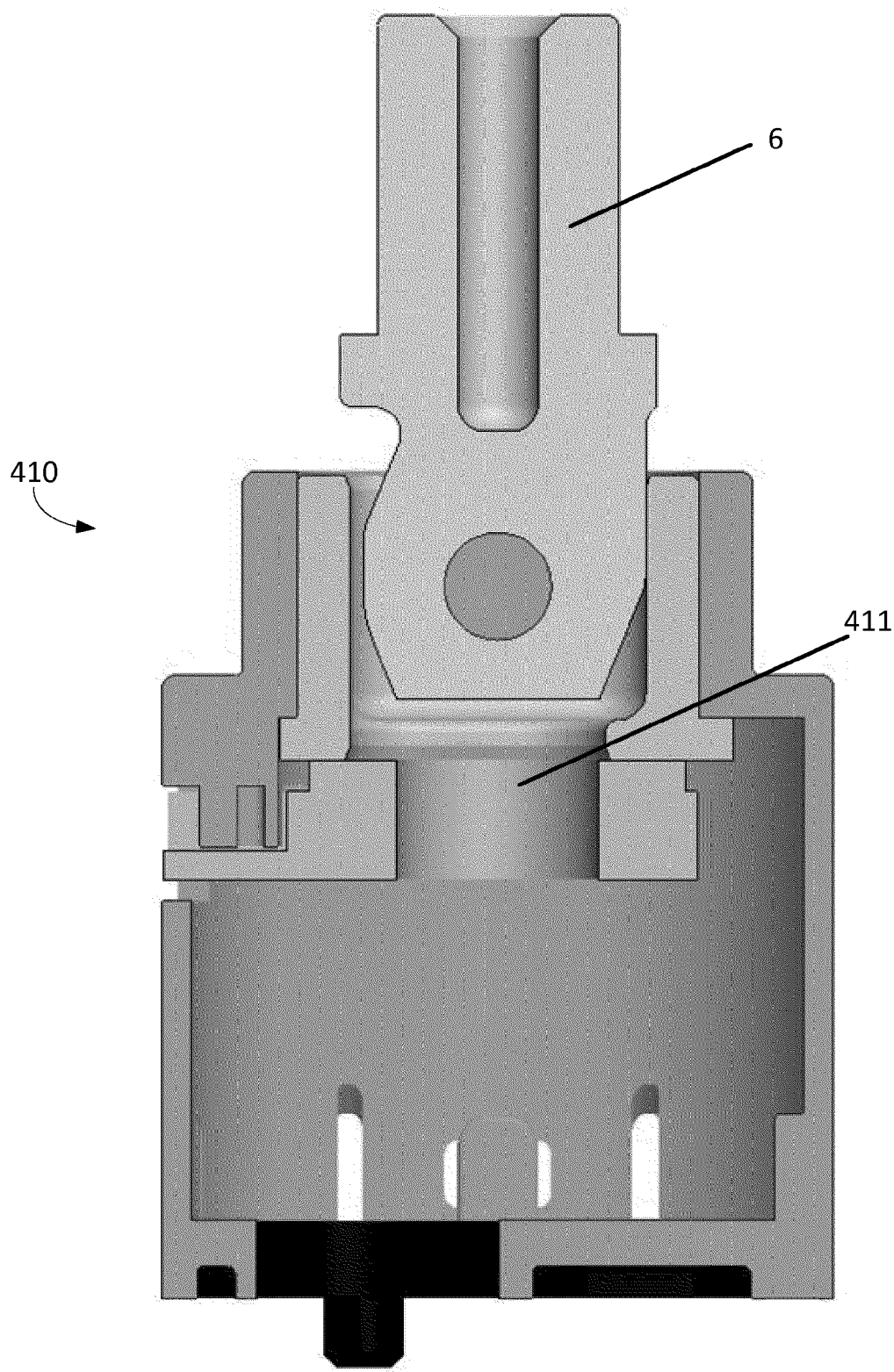
FIG. 16 is a side, cross sectional view of the manual valve of FIG. 13 with a closed valve channel, according to an exemplary embodiment.
Figure 17:
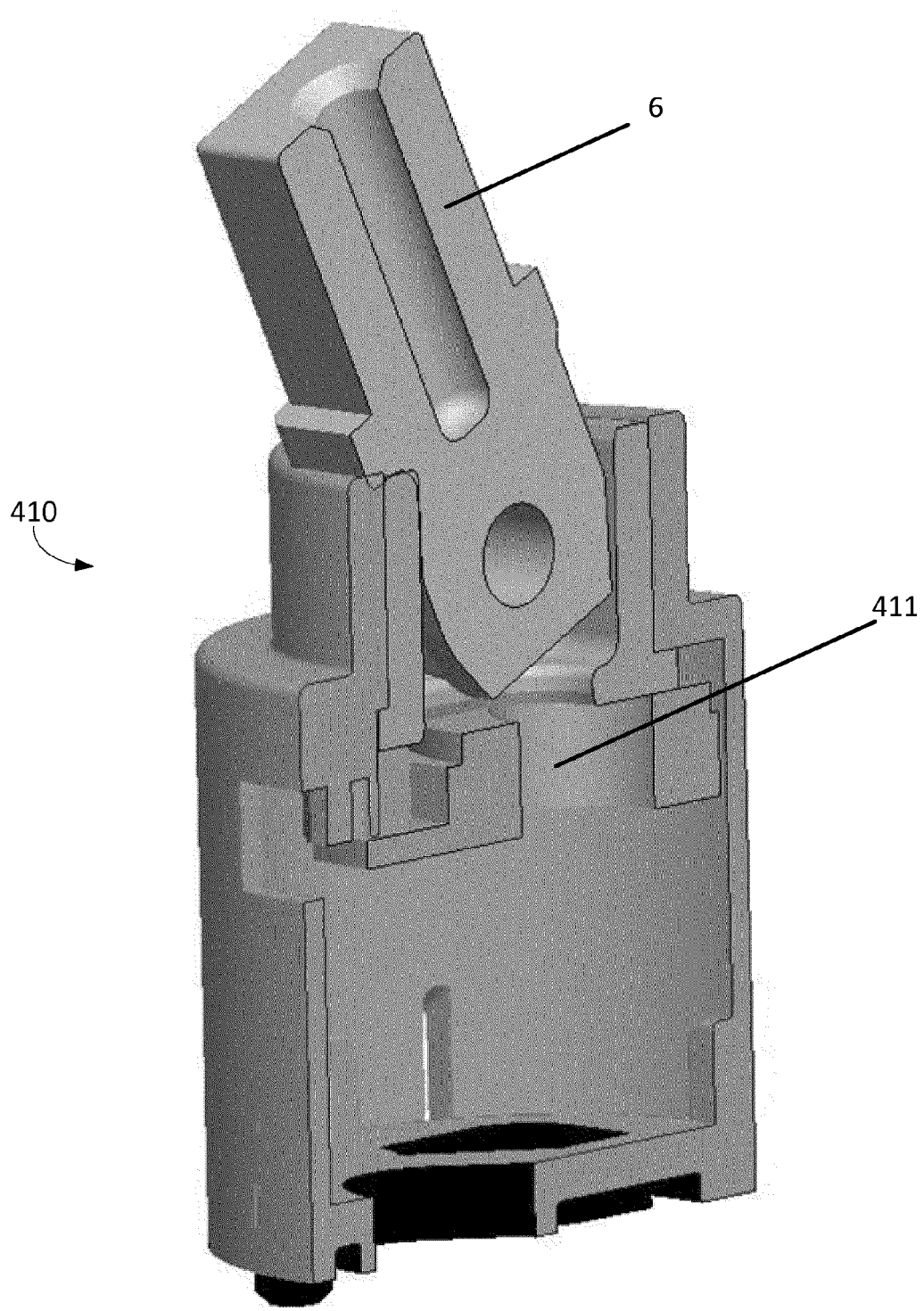
FIG. 17 is a perspective, cross-sectional view of the manual valve of FIG. 14 with an open valve channel, according to an exemplary embodiment.
Figure 18:
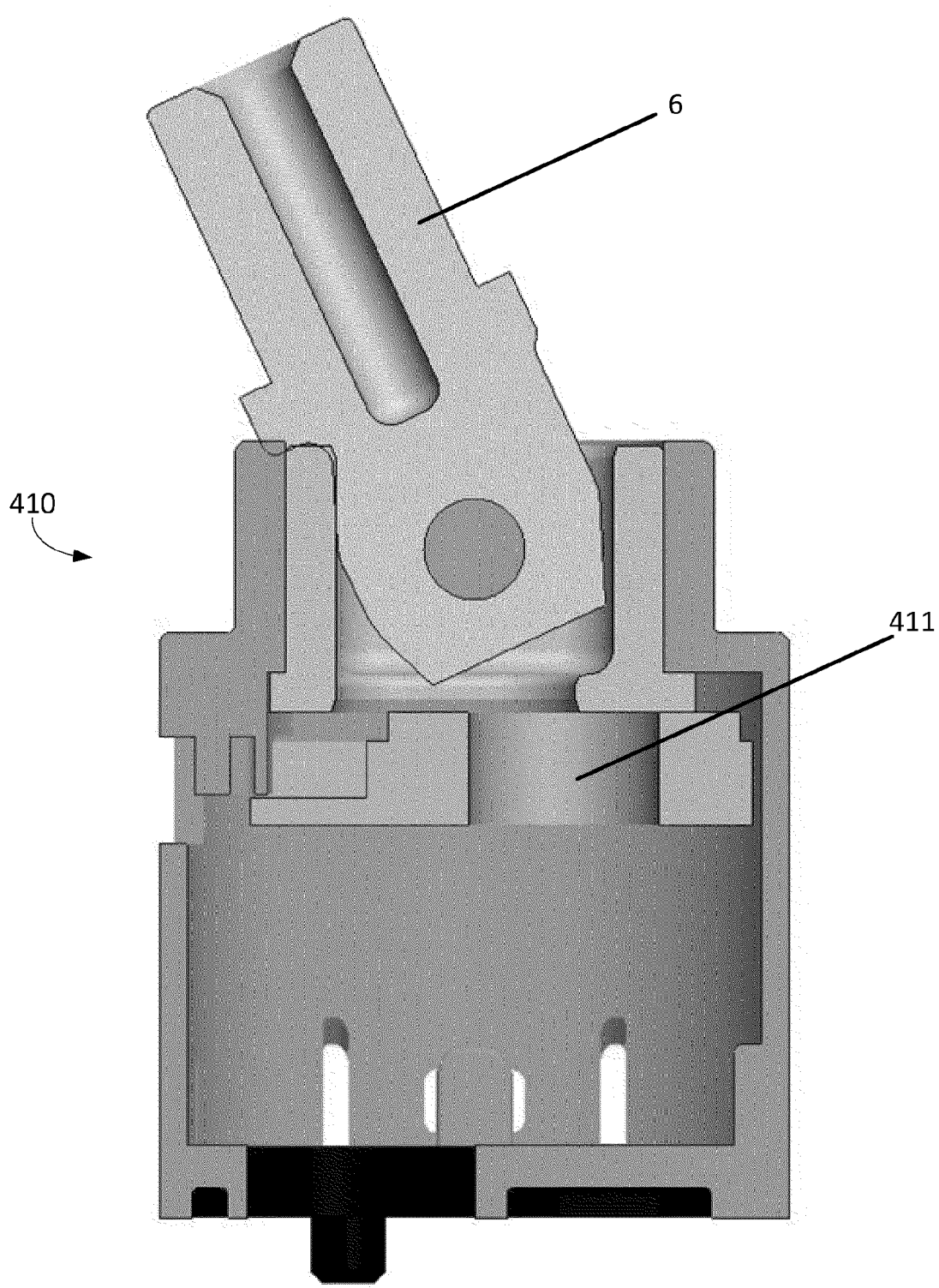
FIG. 18 is a side, cross-sectional view of the manual valve of FIG. 14 with an open valve channel, shown according to an exemplary embodiment.
Figure 19:
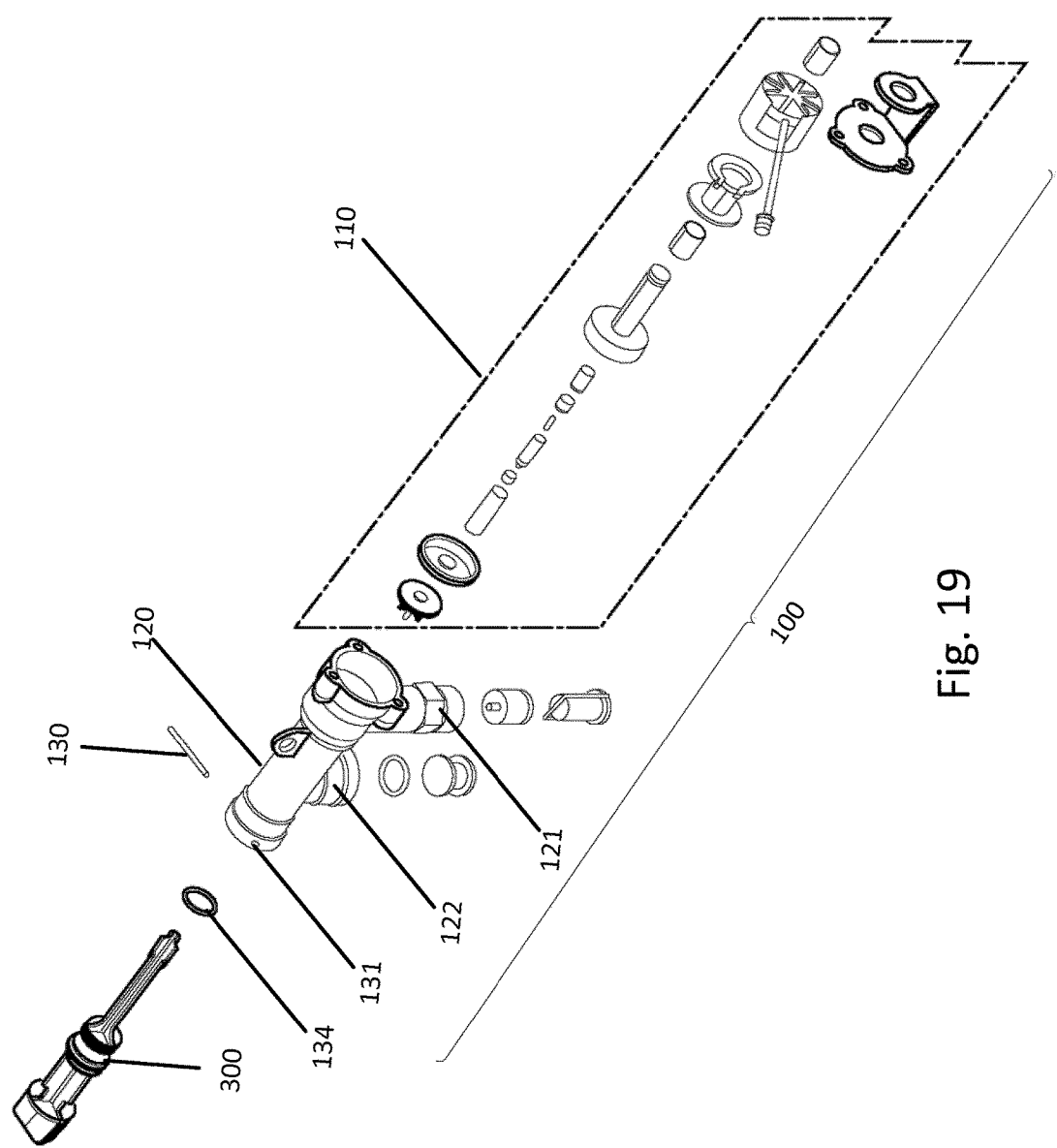
FIG. 19 is an exploded perspective view an electronic valve of the faucet of FIG. 1 and a lifter for manually overriding the electronic valve, shown according to an exemplary embodiment.
Figure 20:
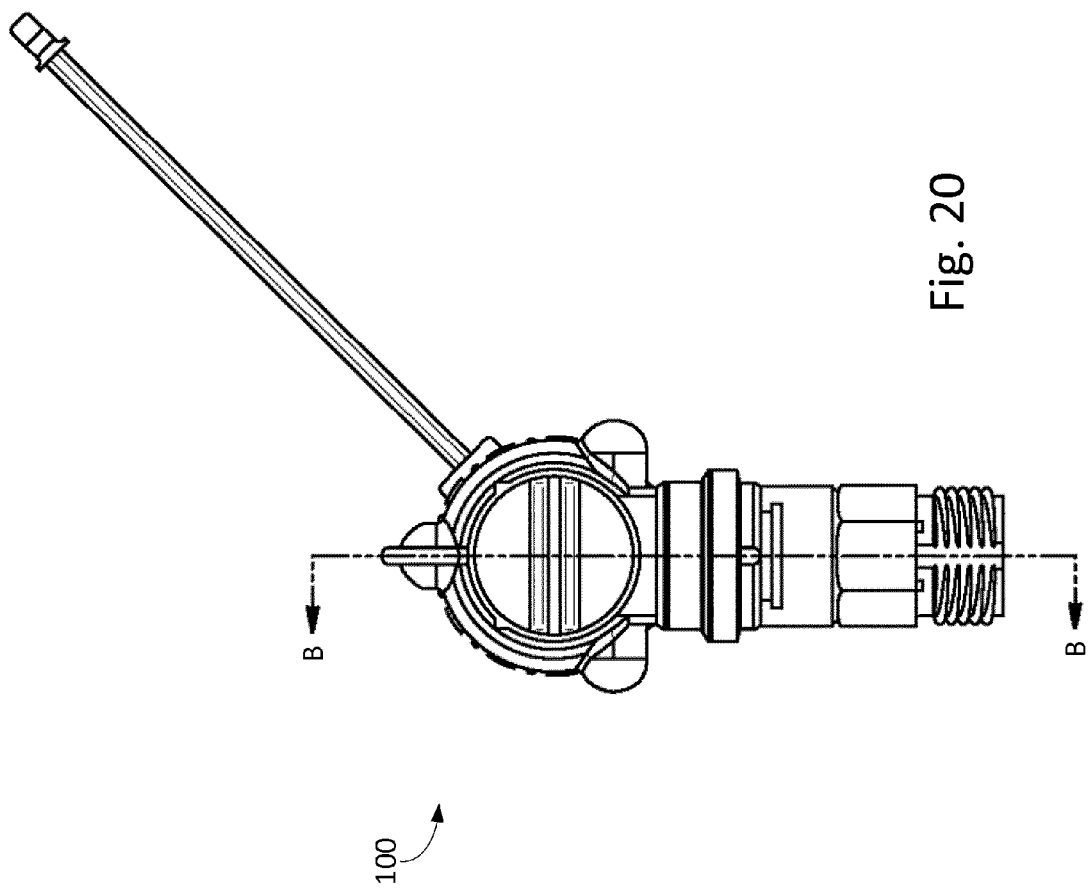
FIG. 20 is a left elevation view of the electronic valve of FIG. 19.
Figure 21:
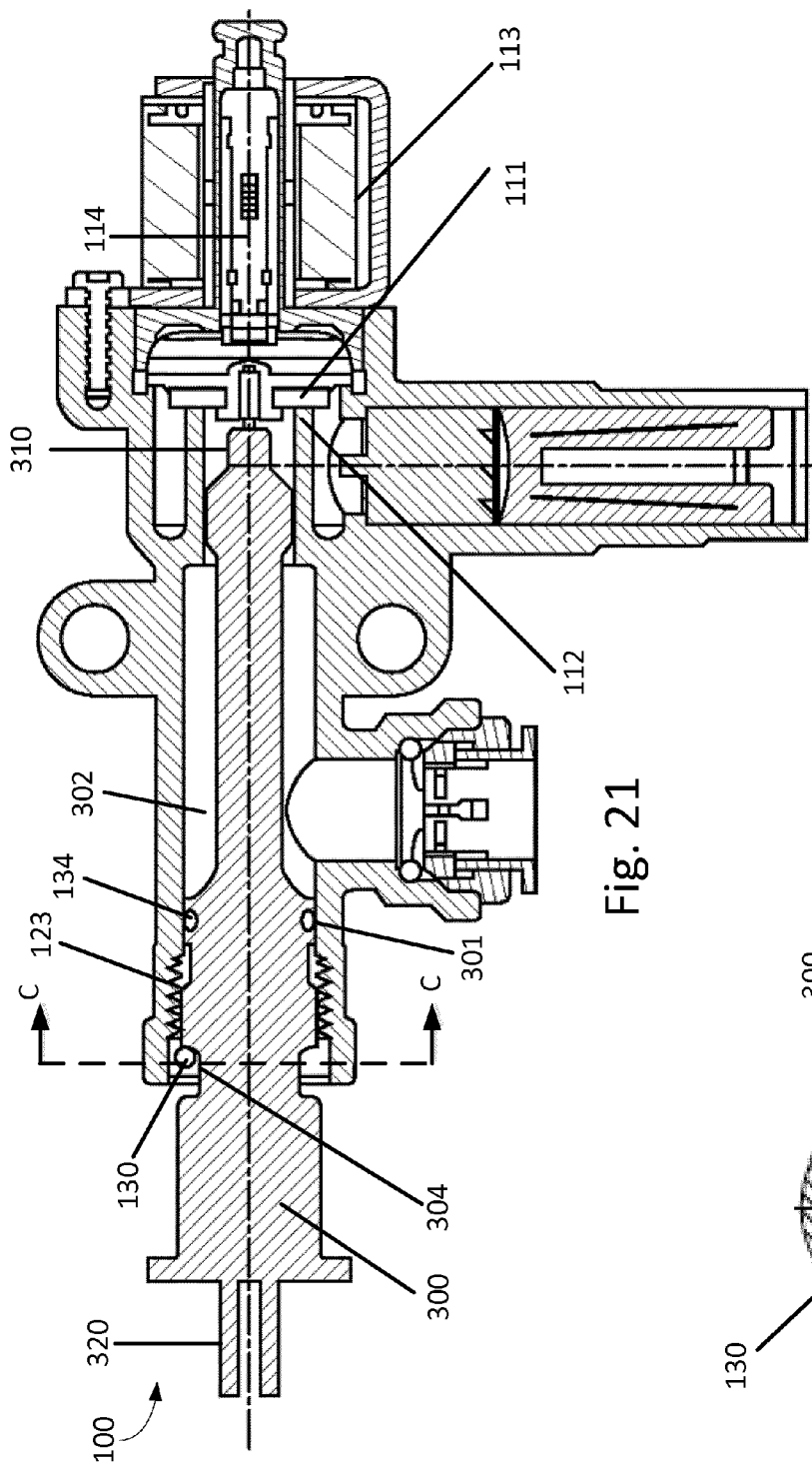
FIG. 21 is a front, cross-sectional view elevation of the electronic valve through a line B-B of FIG. 20.
Figure 22:
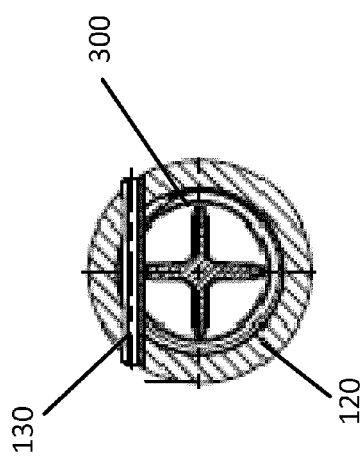
FIG. 22 is a left, cross-sectional view of the electronic valve through a line C-C of FIG. 21.

Referring to briefly FIGS. 13-18, the mechanical valve 410 includes a valve channel member 411 that is radially movable between an open position (see, e.g., FIGS. 14, 17 and 18) and a closed position (see, e.g., FIGS. 13, 15 and 16). The valve channel member 411 may have any suitable cross-sectional shape (e.g., square, rectangle, circular, oval, polygonal, box, etc.). As shown, the valve channel member 411 has a U-shaped cross-sectional shape. As used herein, "radially movable" refers to an in-and-out motion of the valve channel member 411 between an exterior and an interior of the mechanical valve 410. The valve channel member 411 is coupled to a sealing component (not illustrated) within the mechanical valve 410. The valve channel member 411 is configured to translate as the sealing component moves between "off" and "on" positions. In addition, the valve channel member 411 is in communication with an exterior of the mechanical valve 410. The valve channel member 411 may be interconnected to the control stem 6 such that an adjustment of the temperature setting of the mechanical valve 410 (e.g., via the handle 3) does not affect the position of the valve channel member 411.

Referring now to FIGS. 9-14, the ring 420 is configured to be generally coaxial with or disposed at least partially around the mechanical valve 410. The ring 420 has an inner surface and an outer surface, with a diameter of the inner surface being smaller than a diameter of the outer surface. The switch 440 is mounted on the mounting surface 430 disposed on the inner surface of the ring 420. This configuration allows the switch 440 to be positioned above the mechanical valve 410. Thus, fluid from an inadvertent leak in the mechanical valve 410 will tend (e.g., by gravity) to flow down and away from the switch 440 to avoid or minimize damaging the switch 440.

In a preferred embodiment, approximately radially opposite from the switch 440, the ring 420 includes a protrusion 421 configured to engage with the balancing spring 450 and the adjustment screw 460. Therefore, when the ring 420 is placed around the mechanical valve 410, the valve channel member 411 is oriented approximately diametrically opposite from the switch 440. The adjustment screw 460 is configured to engage with the valve channel member 411 and adjust a radial position of the ring 420 relative to an exterior of the mechanical valve 410. Specifically, the valve channel member 411 transfers the motion of the mechanical valve 410 to the adjustment screw 460, which, in turn, transfers the motion of the mechanical valve 410 to the ring 420 by adjusting the radial position of the ring 420 relative to the exterior of the mechanical valve 410. The adjusting may be, for example, fine tuning the radial position of the ring 420 relative to the exterior of the mechanical valve 410. The change in radial position of the ring 420 causes the switch 440, mounted upon the ring 420, to open and close accordingly in response to the translation of the valve channel member 411.

The adjustment screw 460 is also configured to allow the system 400 to compensate for manufacturing variances. A position of the adjustment screw 460 can be set at the manufacturing factory and/or in the field after installing the faucet 10 or service parts thereof. The balancing spring 450 allows the system 400 to compensate for a weight of the ring 420 and the switch 440.

In one embodiment, the mechanical valve 410 could be rotated, for example, 180 degrees such that the valve channel member 411 is located directly beneath (e.g., 0 degrees from) the switch 440. However, this configuration would reverse a motion of the control stem 6, and require modification of the method for adjusting the switch position, as described below. In another embodiment, the mechanical valve 410 could be configured such that the valve channel member 411 exits the top of the valve to directly contact the switch 440.

According to the exemplary embodiment shown, as the mechanical valve 410 moves between the closed state to the open state, the valve channel member 411 translates, transferring the motion of the mechanical valve 410 to the adjustment screw 460 and thereby, the ring 420, causing the switch 440 to actuate (e.g., open, close, etc.) accordingly. For example, when the mechanical valve 410 is in the closed state, the valve channel member 411 is in a closed position defined by an outer surface of the valve channel member 411 being substantially aligned with an outer surface of the mechanical valve 410 (see FIG. 13). In this configuration, the valve channel member 411 pushes down on the adjustment screw 460, which in turn pushes down on the ring 420 and compresses the balancing spring 450. Accordingly, the ring 420 forces the switch 440 against the body or outer surface of the mechanical valve 410, thereby closing the switch 440 (e.g., closed position, first state, second state, etc.). When the mechanical valve 410 is in the open state, the valve channel member 411 is in an open position defined by the outer surface of the valve channel member 411 being depressed or recessed such that the outer surface of the valve channel member 411 is disposed within the mechanical valve 410 (see FIG. 14). In this configuration, the adjustment screw 460 follows the valve channel member 411 in response to the force of the balancing spring 450. The balancing spring 450 pushes the ring 420 upward, away from the body or outer surface of the mechanical valve 410, allowing the normally open switch 440 to return to an open position (e.g., open switch, second state, first state, etc.). According to another embodiment, the valve channel member 411 may be extended out of the mechanical valve 410 when the valve is in the closed state and may move inward to a position aligned with the outer surface of the mechanical valve 410 when the valve is moved to the open state.

The position or actuation of the switch 440 causes an annunciation of an on or off state. For example, the switch 440 may send a signal directly to an annunciator (discussed below) or to the electronic valve system 5, either wirelessly or via wire 431 (see FIGS. 9, 13, and 14), to indicate the on or off state. According to the exemplary embodiment shown, when the switch 440 is in the open position, the electronic valve system 5 turns on the annunciator, and when the switch 440 is in the closed position, the electronic valve system 5 turns off the annunciator.

In another embodiment, the valve channel member 411 may be depressed inward of, or flush with, the surface of the mechanical valve 410 when the mechanical valve 410 is in the closed state. The valve channel member 411 may move radially outward to a flush or proud position relative to the surface of the mechanical valve 410 when the mechanical valve 410 is in the open state. In such an embodiment, the valve channel member 411 may push on the adjustment screw 460, in turn moving the ring 420 radially relative to the mechanical valve 410, and drawing the mounting surface 430 towards the mechanical valve 410, such that the switch 440 closes against the surface of the mechanical valve 410 when the mechanical valve 410 is in the open state, and the switch 440 is open when the mechanical valve 410 is in the closed state. In such an exemplary embodiment, a signal (e.g., voltage, pulse width, power, etc.) to the annunciator may be sent through the switch 440 such that when the switch 440 is in the open position, the electronic valve system 5 does not complete a circuit to the annunciator, and, therefore, the annunciator is turned off. When the switch 440 is in the closed position, the electronic valve system 5 completes the circuit to the annunciator, and, therefore, the annunciator is turned on. In other words, when the manual valve is in the closed state or non-operational mode, the annunciator is turned off, but when the manual valve is in the open state or operational mode, the annunciator is turned on.

In embodiments in which the switch 440 is adjacent or proximate the adjustment screw 460, the end of the valve channel member 411 that abuts the adjustment screw 460 may be configured to move into or towards the mechanical valve 410 when the mechanical valve moves from a closed state to an open state. The switch 440 may then close against the body or outer surface of the mechanical valve 410, causing the annunciator to turn on. The configuration of the actuation could be reversed such that the end of the valve channel member 411 that abuts the adjustment screw 460 may be configured to move out off or away from the mechanical valve 410 when the mechanical valve moves from a closed state to an open state. The switch 440 may be a normally open switch that then opens away from the body or outer surface of the mechanical valve 410, causing the annunciator to turn on (e.g., via the electronic valve system 5, processing electronics, etc.).

According to various other embodiments, the switch 440 may be disposed on the ring 420 and mounting surface 430 such that the switch 440 actuates against an inner surface of the faucet body 2 (e.g., the protruded portion 2A). For example, the switch 440 may be disposed on an outer surface of the ring 420.

Having a switch 440 provides a low-cost, reliable, and robust indicator of state. In another embodiment, the switch 440 may be replaced with a potentiometer or similar device capable of indicating a relative position of the valve channel member 411. The relative position of the valve channel member 411 may be defined, for example, from 0% to 100% open. The position of the valve channel member 411 is correlated (e.g., proportional to, etc.) to a flow through the mechanical valve 410 (i.e., off, low, medium or high). In yet another embodiment, the adjustment screw 460 and/or the balancing spring 450 may be eliminated.

The annunciator is configured to indicate to the user, for example, whether the electronic valve system 5 is in an active mode or an inactive mode (e.g., off mode, hibernation mode, etc.) or some combination thereof (e.g., sleep mode, etc.), whether the mechanical valve is in an open state or a closed state, etc. The annunciator may be a visual indicator such as a light, a single colored LED, multiple colored LEDs (e.g., a red LED for hot fluid and a blue LED for cold fluid), an LCD, a display screen, etc. The display screen may provide information such as temperature, flow, date, time, etc. As illustrated, the annunciator is an LED 433. Alternatively, the annunciator may be an audio indicator such as a beep or tone indicating activation or deactivation of the electronic valve system 5. In addition, both a visual and an audio annunciator may be used simultaneously. The annunciator may be incorporated onto the mounting surface 430 (i.e., the same mounting surface as the switch 440). Alternatively, the annunciator may be located at a different position, for example, at the base 4 or at a different position along the longitudinal axis of the faucet body 2. The position of a visual annunciator is preferably in a position to be easily visible to a user. For example, the light from LED 433 may be visible through a translucent cover 435.

Based on a detected closed or open state of the mechanical valve 410, the electronic valve system 5 may take actions to conserve power. For example, if the mechanical valve 410 is closed, the electronic valve system 5 may enter an off mode. In the off mode, the electronic valve system 5 may turn off (e.g., reduce or remove power from) the annunciator, the sensor 20, and/or the electronic valve 100, 200. In other words, the electronic valve system 5 essentially shuts down, except for a small amount of electricity reserved to reactivate the electronic valve system 5, for example, in response to the mechanical valve 410 being manipulated to the open state. If the annunciator is off (i.e., the electronic valve system 5 is in an off mode), notice is provided to the user that the mechanical valve 410 must be opened before the faucet 10 will provide fluid. When the user manipulates the control stem 6 to open the mechanical valve 410, fluid is provided to the electronic valve 100, 200, and the electronic valve system 5 is reactivated. When the electronic valve system 5 is reactivated or in the active mode, the electronic valve system 5 energizes (e.g., opens) the electronic valve and provides fluid to the user. The user can then pause or resume fluid flow as desired by triggering the sensor 20.

In contrast, if the annunciator is on (e.g., the electronic valve system 5 is in active mode), notice is provided to the user that the mechanical valve 410 is already opened and thus, the user need only trigger the sensor 20 by engaging the sensor's field of detection 70 in order to resume fluid flow. Thus, the system 400 may detect a closed or open state/position of the mechanical valve 410 and communicate the information to the electronic valve system 5 and/or the user.

A method for touchless actuation of the faucet 10 will now be discussed. As previously described, when the handle 3 is in the operational mode, a position of the electronic valve 100, 200 may pause or resume the flow of the fluid from the faucet spout 1. Specifically, when the electronic valve 100, 200 is in the open position, the fluid continues to flow from the faucet spout 1 when the handle 3 is in the operational mode. When the electronic valve 100, 200 is in the closed position, a flow of the fluid from the faucet spout 1 is paused, even if the handle 3 is in the operational mode. When the handle 3 is in the non-operational mode, the fluid will not flow from the faucet spout 1 regardless of the position of the electronic valve 100, 200.

When the mechanical valve 410 is in the operational mode and the electronic valve 100, 200 is in the open position, the flow of fluid from the faucet spout 1 may be paused by engaging or triggering the sensor 20. The sensor 20 may be triggered by using an object, for example, a user's hand or a dish, to engage the field of detection 70 of the sensor 20 at a first time. In one embodiment, the sensor 20 may be an infrared sensor. When an infrared sensor is utilized, engaging the sensor's field of detection 70 refers to interrupting (e.g., blocking, etc.) or reflecting a beam of infrared light that is projected by an emitter. In other embodiments, a different type of sensor (e.g., ultrasonic, capacitive, etc.) may be utilized. One of ordinary skill in the art would appreciate that the sensor's field of detection may be engaged in a different manner unique to the type of sensor utilized. When the object engages the sensor's field of detection 70, the sensor 20 sends a signal to the electronic valve system 5, and the electronic valve system 5 causes the electronic valve 100, 200 to move from the open position (see, e.g., FIG. 29) to the closed position (see, e.g., FIG. 28).

The flow of fluid from the faucet spout 1 may be resumed by retriggering the sensor 20 by using an object, for example, a user's hand or a dish, to engage the field of detection 70 of the sensor 20 at a second time. When the object engages the field of detection 70 of the sensor 20, the sensor 20 sends a signal to the electronic valve system 5, and the electronic valve system 5 causes the electronic valve 100, 200 to move from the closed position (see, e.g., FIG. 28) to the open position (see, e.g., FIG. 29). The object used to engage the sensor's field of detection the second time may be the same or different from the object used to engage the sensor's field of detection the first time.

As previously stated, when the mechanical valve 410 is in the closed state or the non-operational mode, the fluid will not flow from the outlet 8 regardless of the position of the electronic valve. Thus, it is desirable for the electronic valve system 5 to be able to detect and communicate a condition, either open state or closed state, of the mechanical valve 410.

Figure 31:
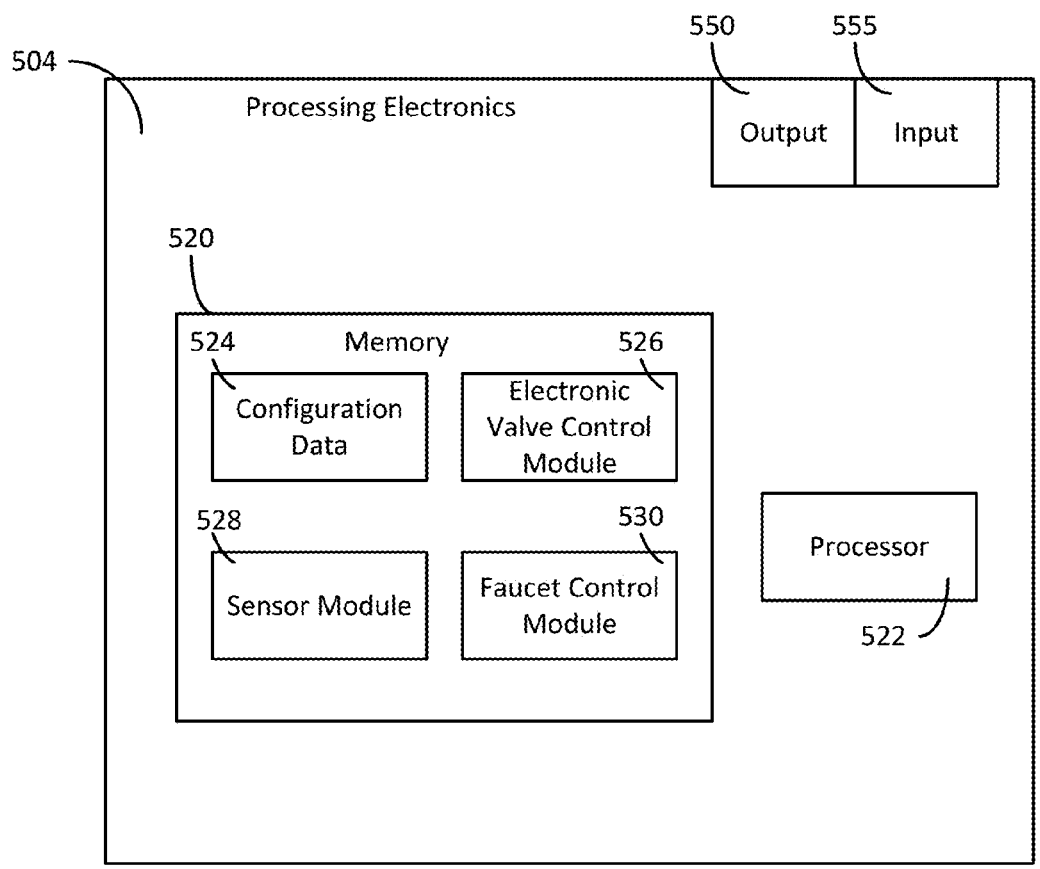
FIG. 31 is a block diagram of the processing electronics of the faucet of FIG. 1, according to an exemplary embodiment.

According to various exemplary embodiments, electronic valve system 5 may include processing electronics configured to support and enable the system and methods such as those described in this disclosure. Referring to FIG. 31, a detailed block diagram of processing electronics 504 of FIG. 1 is shown, according to an exemplary embodiment. Processing electronics 504 includes a memory 520 and processor 522. Processor 522 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 522 is configured to execute computer code stored in memory 520 to complete and facilitate the activities described herein. Memory 520 can be any volatile or non-volatile memory device capable of storing data or computer code relating to the activities described herein. For example, memory 520 is shown to include modules 524-530 which are computer code modules (e.g., executable code, object code, source code, script code, machine code, etc.) configured for execution by processor 522. When executed by processor 522, processing electronics 504 is configured to complete the activities described herein. Processing electronics 504 includes hardware circuitry for supporting the execution of the computer code of modules 524-530. For example, processing electronics 504 includes hardware interfaces (e.g., output 550) for communicating control signals (e.g., analog, digital) from processing electronics 504 to electronic valve 100, 200. Processing electronics 504 may also include an input 555 for receiving, for example, signals from sensor 20, mechanical valve detection system 400, or for receiving data or signals from other systems or devices.

Memory 520 includes configuration data 524. Configuration data 524 includes data relating to the electronic valve system 5. For example, configuration data 524 may include solenoid data which may be used by the electronic valve control module 526 to control the operation of the electronic valve 100, 200. For example, configuration data 524 may include sensor data which may be used by the sensor module 526 to control the operation of the sensor 20 or to interpret signals from the sensor 20.

Memory 520 is further shown to include an electronic valve control module 526, which includes logic for operating or sending signals to the electronic valve 100, 200. For example, in an embodiment in which the electronic valve 100, 200 includes a solenoid, the electronic valve control module 526 may include logic for controlling the solenoid valve.

Memory 520 is further shown to include a sensor module 528, which includes logic for controlling or interpreting signals from/to the sensor 20. For example, the sensor module 528 may include logic for turning the sensor 20 on or off. For example, the sensor module 528 may include logic for interpreting signals received by the sensor 20 (e.g., distinguishing signal from noise, etc.). For example, the sensor module 528 may include logic for controlling or generating signals (e.g., infrared beam, ultrasonic waves, etc.) emitted by the sensor 20.

Memory 520 is further shown to include a faucet control module 530, which includes logic for controlling the electronic valve system 5. For example, the faucet control module 530 may include logic for determining a faucet state or mode based on various inputs or events (e.g., handle position, elapsed time, interruption of the field of detection 70 of the sensor 20, etc.). For example, the faucet control module 530 may include logic for determining and enunciating information to a user (e.g., faucet state, water temperature, etc.).

Referring to FIGS. 32A-E, a flowchart of a process 600 for controlling a faucet (e.g., the faucet 10), is shown according to an exemplary embodiment. Although the process 600 may be started at any point, for the purposes of clarity, the process 600 is described as beginning at Reset (step 601). At Reset, power may be initially provided to the electronics of the faucet, for example, at initial installation or after recovering from a power outage. The process 600 includes the steps of initializing the processor and peripherals (step 602), setting the initial state of all control lines (step 604), initializing firmware variables (step 606), reading the faucet state, and reestablishing faucet as OFF or PAUSED (step 608). Reestablishing the faucet as OFF or PAUSED ensures that fluid does not flow or begin to flow through the electronic valve 100, 200 after interruption of electrical power to the faucet 10.

The process 600 is further shown to include the step of determining whether the faucet switch is ON or OFF (step 610). For example, the process 600 may determine whether the handle 3 is in an operational or non-operational mode (e.g., open or closed position) based on the state of the switch 440 of the mechanical valve detection system 400. If the faucet switch is determined to be ON, then the sensor 20 is turned on (step 612), or kept on if the sensor 20 is already on.

Process 600 is further shown to include the step of determining whether the faucet state is ON or OFF (step 614). If the faucet state is OFF, then the process 600 opens the solenoid valve starts the automatic shutoff timer (step 616) and sets the faucet state to ON (step 618). If the faucet state is determined to be ON (step 614), then the process proceeds directly to step 618 because the solenoid valve and the automatic shutoff timer should have already been actuated.

Figure 32A:
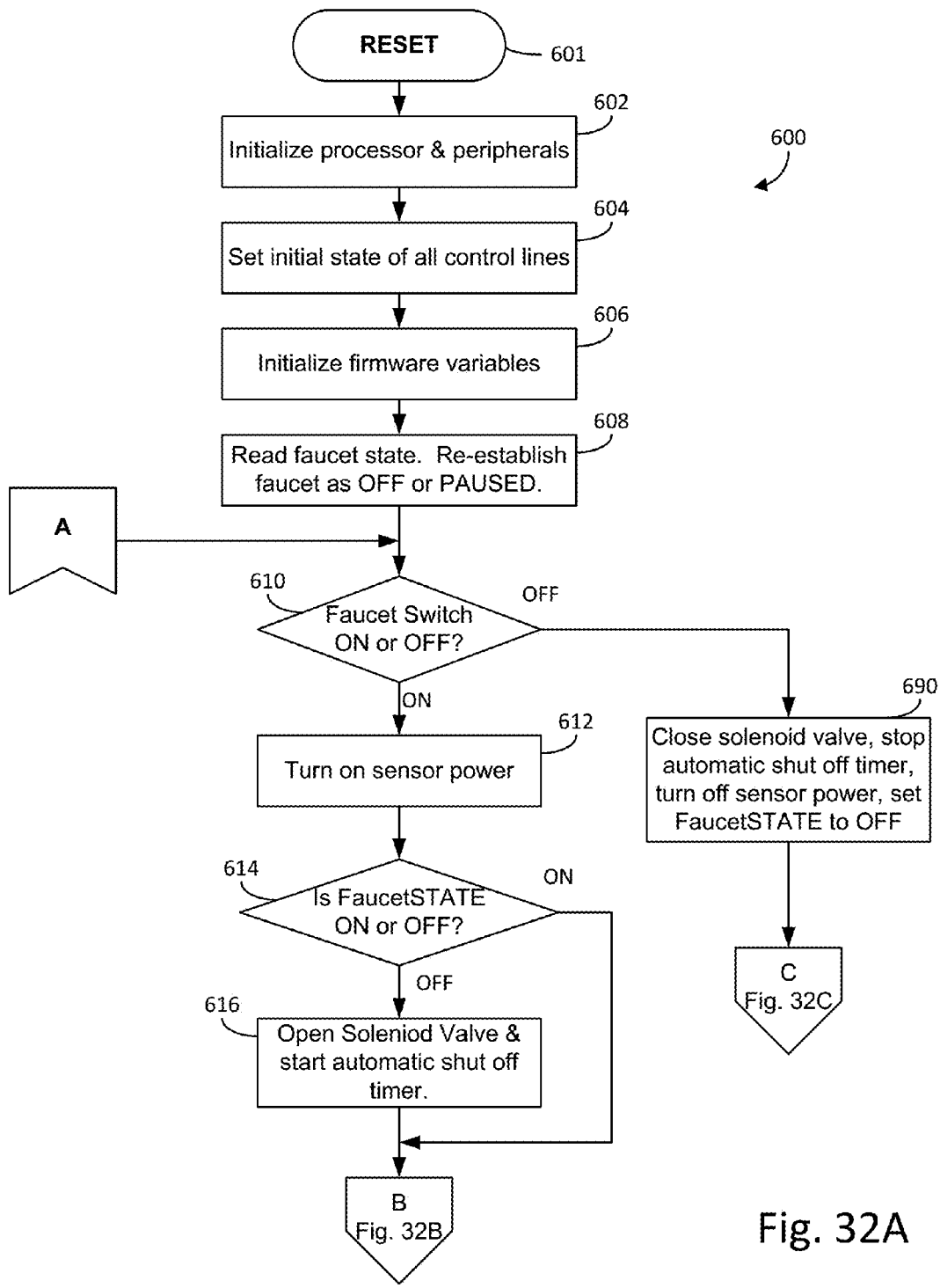
FIGS. 32A-E illustrate a flowchart of a process of controlling a faucet, shown according to an exemplary embodiment.
Figure 32B:
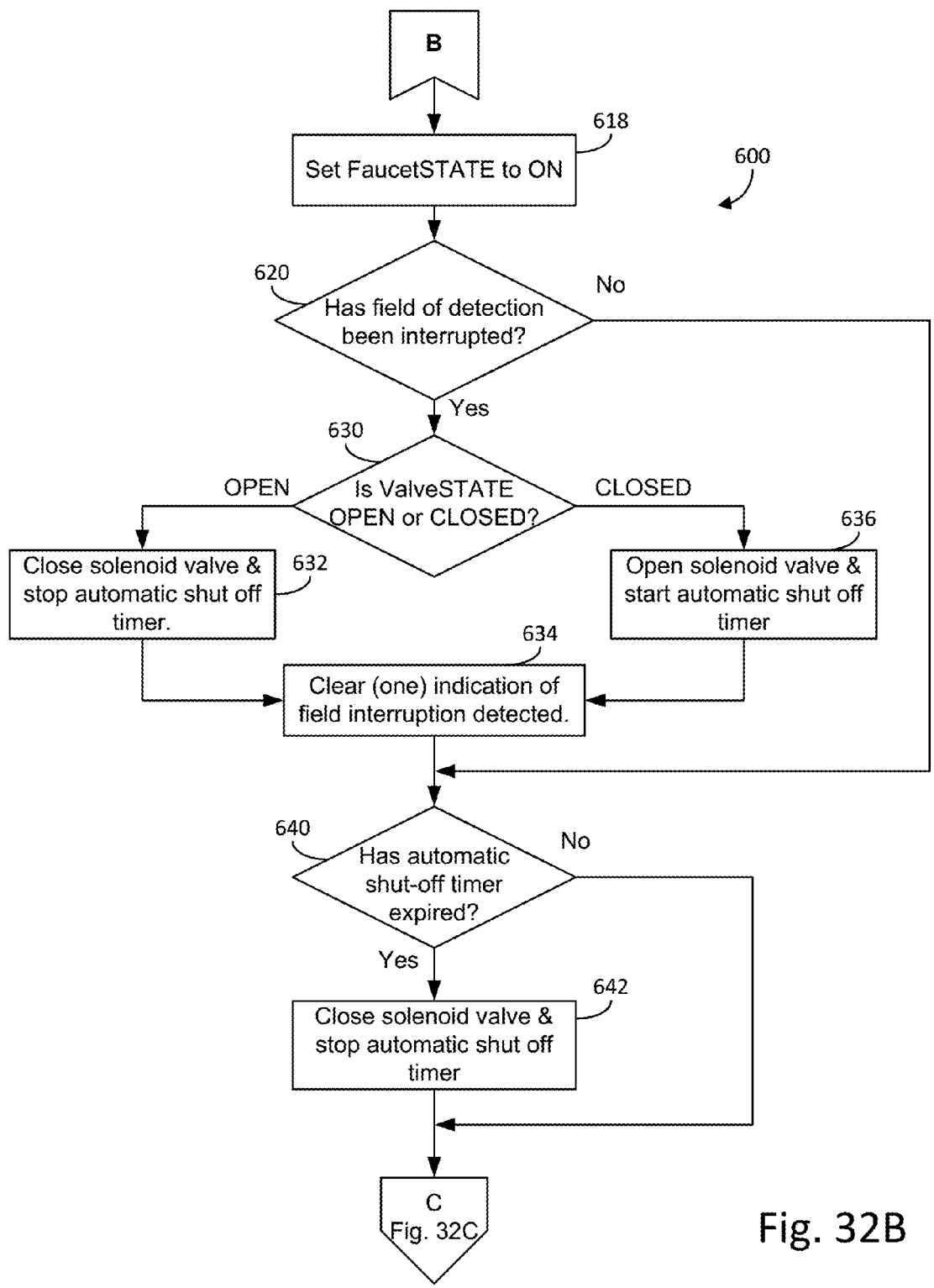

Referring to FIG. 32B, the process 600 is further shown to include the step of determining whether the field of detection has been interrupted (step 620). For example the process 600 may determine whether field of detection 70 has been interrupted (e.g., by a user, by an object, etc.) in response to a signal that the sensor 20 has received a beam reflected back to it or had a beam blocked from it. If the process 600 determines that the field of detection has been interrupted, then the process 600 proceeds to determine if the valve state is OPEN or CLOSED (step 630). If the valve state is OPEN, then the process 600 closes the solenoid valve, stops the automatic shutoff timer (step 632), and clears an indication of field interruption detection (step 634). If the valve state is determined to be CLOSED, then the process 600 opens the solenoid valve, starts the automatic shutoff timer (step 636), and clears the indication of field interruption detection (step 634). According to an exemplary embodiment, interrupting the field of detection 70 a first time causes the electronic valve 100, 200 to close and to stop the flow of fluid through the electronic valve 100, 200, and interrupting the field of detection 70 a second time causes the electronic valve 100, 200 to open and to permit the flow of fluid through the electronic valve 100, 200.

The process 600 is shown to further include the step of determining whether an automatic shutoff timer has expired (step 640). If the automatic shutoff timer has expired and the process 600 proceeds to close the solenoid valve, to stop the automatic shutoff timer (step 642) and to proceed to read a fluid temperature, for example, a thermistor voltage using an analog to digital converter (step 650). If the process 600 has determined that the automatic shutoff timer has not expired, then the process 600 proceeds directly to step 650. Having an automatic shutoff timer conserves resources such as water and prevents overflowing of a sink or basin by shutting off the flow of fluid after a predetermined amount of time. According to various embodiments, the automatic shutoff timer may expire after one minute, two minutes, three minutes, five minutes, six minutes, ten minutes, or any other suitable amount of time. According to an exemplary embodiment, the automatic shutoff timer may expire after four minutes. The expiry time of the automatic shutoff timer may be a preconfigured feature of the electronic valve system 5 (e.g., programmed at the factory) or a feature that is selectable and reprogrammable by an end-user.

Figure 32C:
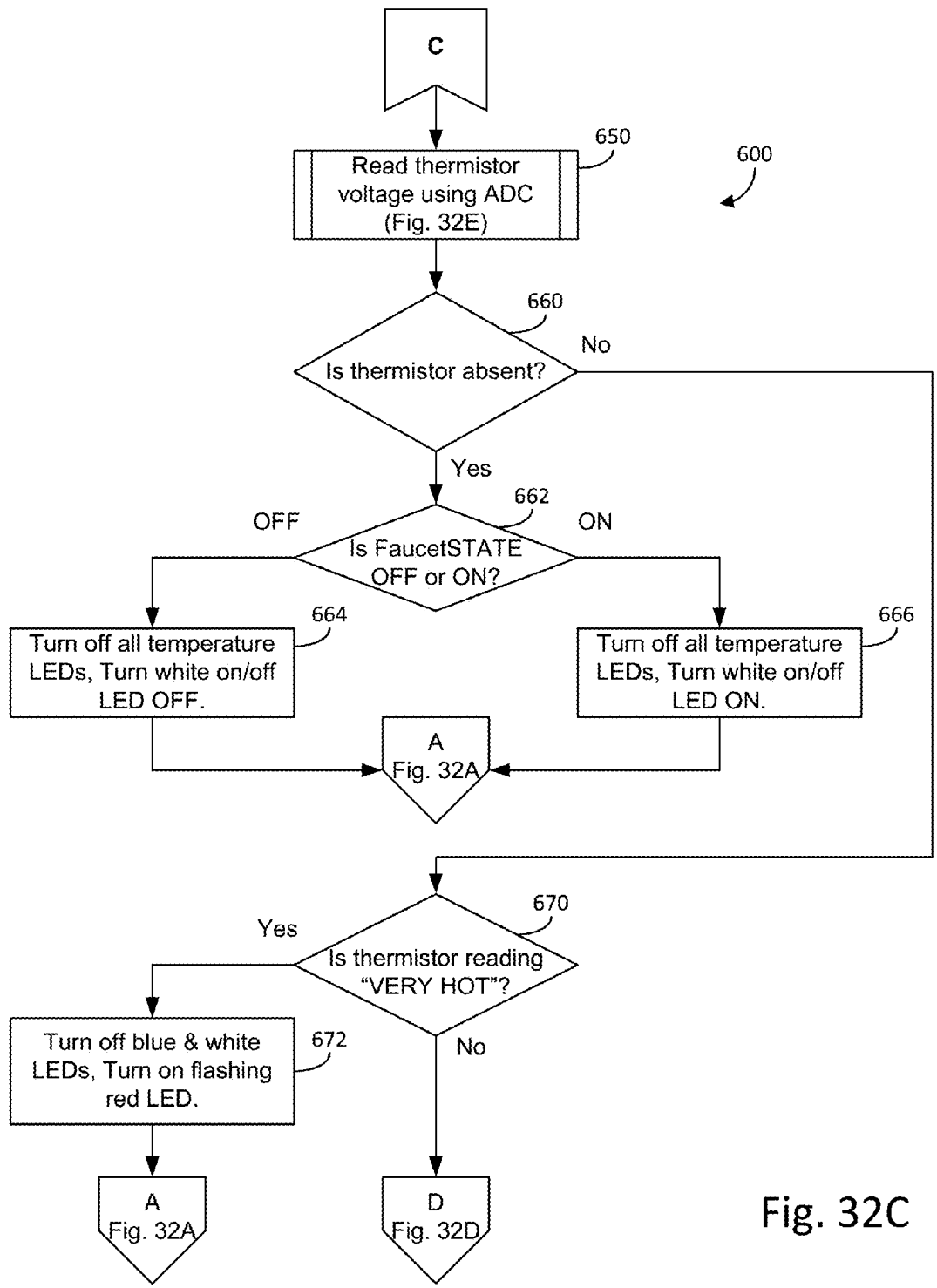
Figure 32D:
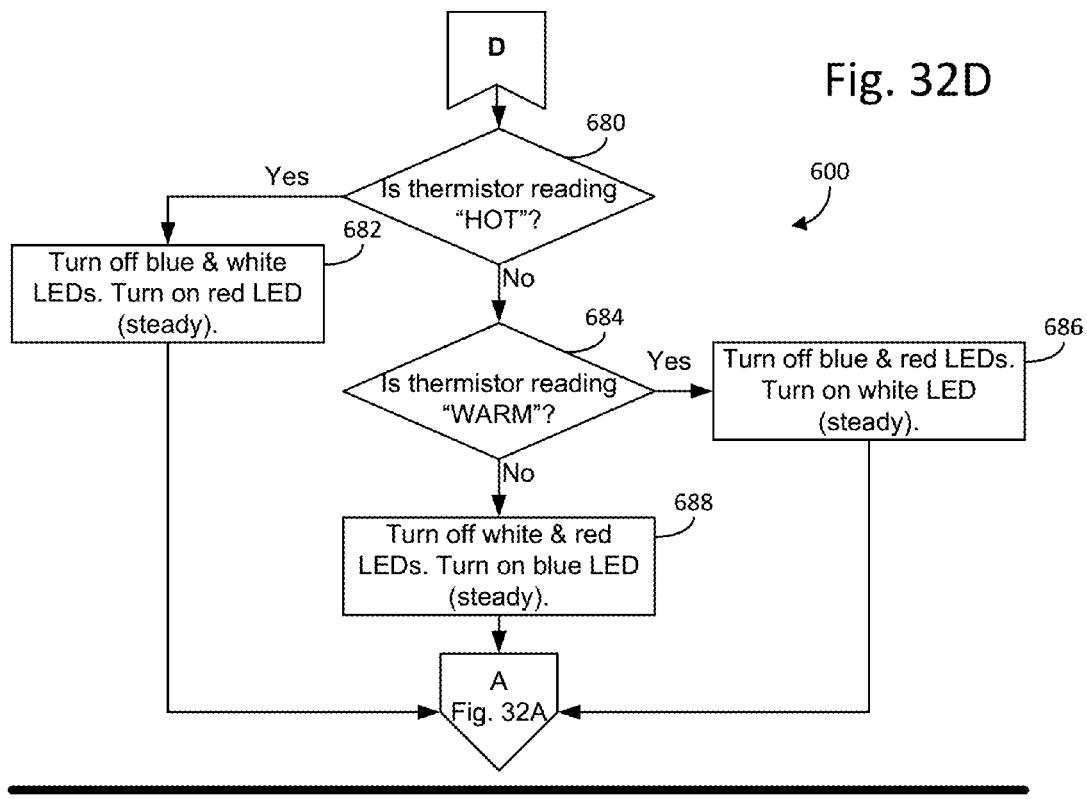
Figure 32E:
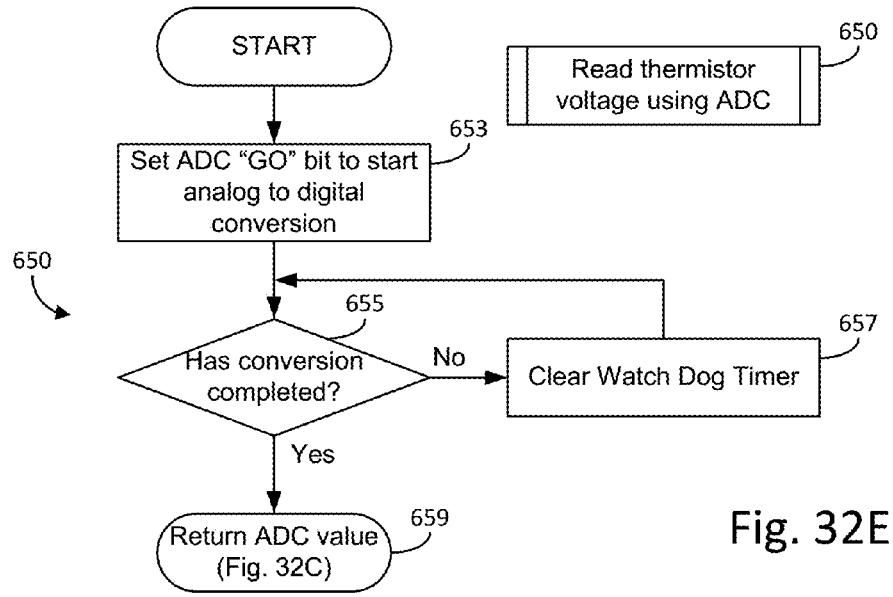

Referring to FIGS. 32C-E, the process 600 may include steps (e.g. steps 650-688) for determining the temperature of the fluid supplied to the outlet 8 of the faucet 10 and annunciating that information to a user. Temperature information may be annunciated to the user through an annunciator (e.g., a display, an LCD, a system of one or more indicators, color-coded LEDs, LED 433, a speaker, an electro-acoustic transducer, etc.).

Referring now more specifically to FIGS. 32C and 32E, the process 600 is shown to include a subroutine for reading a thermistor voltage using an analog to digital converter (ADC) (steps 653-659). While a thermistor is described in the exemplary embodiment, according to various other embodiments, any suitable temperature sensor (e.g., thermometer, thermocouple, thermostatic elements, etc.) may be used. The thermistor may be located anywhere that may provide the temperature of the fluid, for example, in the spout 1, the body 2, upstream of the mechanical valve 410, between the mechanical valve 410 and the electronic valve 100, 200, etc. According to an exemplary embodiment, the thermistor is located proximate the electronic valve 100, 200, downstream of the electronic valve 100, 200.

The subroutine 650 is shown to include the step of setting analog-to-digital converter "GO" bit to start analog-to-digital conversion (step 653). Subroutine 650 is further shown to determine whether analog-to-digital conversion has been completed (step 655). If analog-to-digital conversion has not been completed then the subroutine 650 dwells. As shown the subroutine 650 may include a watchdog timer reset (clear) (step 657). The analog-to-digital conversion has been completed, and the resulting ADC value is returned to the process 600 at step 660 (step 659). According to one embodiment, if the analog-to-digital conversion fails, the watchdog timer of step 657 returns a value or signal to step 660 of the process 600.

Returning to FIG. 32C, process 600 is shown to determine whether the thermistor is absent (step 660). According to one embodiment, the thermistor may be determined absent if the watchdog timer of step 657 indicates that the analog-to-digital conversion has failed. According to another embodiment, the thermistor may be determined absent if the analog-to-digital conversion returns an absurd or extreme value (e.g., 999 counts), which may indicate that the electronic valve system 5 does not include a thermistor. If the process 600 determines that the thermistor is absent, then the process 600 determines if the faucet state is ON or OFF (step 662). If the faucet state is OFF, then all of the temperature annunciators (e.g., temperature LEDs, red and blue LEDs, etc.) are turned OFF, and the faucet state annunciator (e.g., a white LED, and on/off LED, etc.) is turned OFF (step 664). If the faucet state is ON, then all of the temperature annunciators (e.g., temperature LEDs, red and blue LEDs, etc.) are turned OFF, and the faucet state annunciator (e.g., a white LED, and on/off LED, etc.) is turned ON (step 666). Referring to steps 610-618, and foreshadowing step 690, the faucet state indicates whether the faucet switch (e.g., switch 440), and, therefore, the valve stem 6 and handle 3, are in an open or closed position. Accordingly, the faucet state annunciator (e.g., white LED, LED 433, etc.) will annunciate to a user whether a user should control the faucet 10 by using the handle 3 or by engaging the field of detection 70 of the sensor 20. After either step 664 or step 666, the process 600 again determines whether the faucet switch is ON or OFF (step 610).

If the process 600 determines that a thermistor is not absent (e.g., present) (step 660), then the process determines the temperature of the fluid and annunciates the fluid temperature to a user. Such temperature annunciation may inform a user if the fluid is cool enough to drink, warm or hot enough to wash dishes, or so hot as to provide annoyance or pain (e.g., very hot, extremely hot, etc.), etc. Exemplary temperature ranges are provided below; however, other temperatures may be selected in other embodiments.

If the process 600 determines that thermistor is reading a "very hot" fluid temperature (step 670), then the process 600 turns off the cold (e.g., cool, tepid, etc.) annunciator (e.g., a blue LED) and the warm (e.g., neutral, mild, etc.) annunciator (e.g., a white LED), and flashes a hot annunciator (e.g., a red LED) (step 672). For example, if the process 600 determines that the fluid temperature exceeds a predetermined "very hot" value (e.g., 120° F., 125° F., 48° C., 50° C., 52° C., some value between 118 F and 125 F, some value between 48° C. and 52° C., etc.), then the process annunciates the very hot fluid temperature. According to another embodiment, the "very hot" fluid temperature may be annunciated with its own color LED, a combination of colored LEDs, or the temperature may be caused to be shown on a display, etc. According to one embodiment, the rate at which the LED flashes may correspond or correlate to the temperature of the fluid. For example, faster flashing may annunciate a hotter fluid temperature. Then process 600 proceeds to determine is the faucet switch is ON or OFF (step 610).

Referring to FIG. 32D, if the thermistor reading is not "very hot" (e.g., does not exceed the "very hot" predetermined value) then the process 600 determines whether the thermistor is reading a "hot" fluid temperature (step 680). If the process 600 determines that thermistor is reading a "hot" fluid temperature, then the process 600 turns off the cold annunciator (e.g., a blue LED) and the warm annunciator (e.g., a white LED), and steadily illuminates the hot annunciator (e.g., a red LED) (step 682). For example, if the process 600 determines that the fluid temperature exceeds a predetermined "hot" value (e.g., 95° F., 100° F., 105° F., 35° C., 40° C., 45° C., some value between 95° F. and 105° F., some value between 35° C. and 45° C., etc.), then the process 600 annunciates the hot fluid temperature. According to another embodiment, temperature may be caused to be shown on a display, etc. Process 600 then proceeds to determine if the faucet switch is ON or OFF (step 610).

If the thermistor reading is not "hot" (e.g., does not exceed the "hot" predetermined value) (step 680), then the process 600 determines whether the thermistor is reading a "warm" fluid temperature (step 684). If the process 600 determines that thermistor is reading a "warm" fluid temperature, then the process 600 turns off the cold annunciator (e.g., a blue LED) and the hot annunciator (e.g., a red LED), and turns on the warm annunciator (e.g., a white LED) (step 686). For example, if the process 600 determines that the fluid temperature exceeds a predetermined "warm" value (e.g., 75° F., 80° F., 85° F., 24° C., 25 C, 27° C., 30° C., some value between 75° F. and 85° F., some value between 24° C. and 30° C., etc.), then the process 600 annunciates the warm fluid temperature. According to another embodiment, temperature may be caused to be shown on a display, etc. Process 600 then proceeds to determine if the faucet switch is ON or OFF (step 610).

If the thermistor reading is not "warm" (e.g., does not exceed the "warm" predetermined value) (step 684), then the process 600 turns off the warm annunciator (e.g., a white LED) and the hot annunciator (e.g., a red LED), and turns on the cold annunciator (e.g., a blue LED) (step 688). According to another embodiment, temperature may be caused to be shown on a display, etc. Process 600 then proceeds to determine if the faucet switch is ON or OFF (step 610).

According to other embodiments, the process 600 may be configured to determine whether the thermistor reading is in a range of values, whether the thermistor reading is less than a predetermined value, whether the thermistor reading is above a predetermined value, or some combination thereof.

Returning to FIG. 32A, if the faucet switch is OFF (step 610), the process 600 closes the solenoid valve, stops the automatic shut off timer, turns off sensor power, and sets the faucet state to OFF (step 690). For example, if the process 600 detects the handle 3 is in a closed position (e.g., via the switch 440), then the electronic valve system turns off components, for among other things, to conserve power. Process 600 then proceeds to read the thermistor voltage using ADC (step 650). Measuring and annunciating the fluid temperature even after the touchless or hands-free control system is turned off provides a user with temperature information. For example, if the previous user left the control handle 3 in the very hot position, the subsequent user may be forewarned of the temperature of the fluid. According to another embodiment, the thermistor may turn off after a period of time, after the fluid temperature has dropped below a predetermined value, or after the fluid temperature has progressed slowly downward through temperature ranges (cooled off). Accordingly, the thermistor may then be determined as absent at step 660.

It is contemplated that other exemplary embodiments of the method may include more or fewer steps. For example, according to one embodiment, after closing the solenoid valve, stopping the automatic shut off timer, turning off the sensor power, and setting the faucet state to OFF (step 690, see FIG. 32A), the process may return to sensing if the faucet switch is ON or OFF (step 610). Such an embodiment would bypass steps 650-688 when the faucet handle is detected closed. Similarly, after the solenoid valve is closed and the automatic shut off timer is stopped (step 642, see FIG. 32B), the process may return to sensing if the faucet switch is ON or OFF (step 610). According to another embodiment, steps shown as a single step may be performed as separate steps. For example, closing the solenoid valve, stopping the automatic shut off timer, turning off the sensor power, and setting the faucet state to OFF (step 690, see FIG. 32A), may be performed as two or more separate steps or substeps.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision steps.

Referring now to FIGS. 19-30, the faucet 10 may further include a system for manually overriding the electronic valve system 5. For example, in the event of a power failure, the electronic valve 100, 200 may default to a closed position, and the faucet would be rendered inoperable until power is resumed. A manual override system allows a user to operate the faucet by manually actuating the electronic valve 100, 200 from the closed position to an open position. According to the exemplary embodiments shown, the electronic valve 100, 200 is a solenoid-operated valve, and a lifter is used to manually move the solenoid plunger from a close position to an open position. While a solenoid-based electronic valve is described with respect to the manual override system, it is contemplated that non-solenoid electronic valves may be used with the faucet 10.

Referring now to FIGS. 19-22 and 26-27, a first exemplary embodiment of the electronic valve 100 is provided. The electronic valve 100 includes a solenoid portion 110 and a valve body 120. The solenoid portion 110 includes the components of any known, commercially available solenoid operated valve. For example, the solenoid portion 110 includes, but is not limited to, a sealing element 111, a sealing surface 112, a solenoid coil 113, and a plunger 114. The sealing element 111 may be, for example, a diaphragm, a poppet, etc. The sealing element 111 may include a pilot vent hole (not illustrated) and a second vent hole (not illustrated). Other components of the solenoid portion 110 that may be present in the electronic valve 100 may not be illustrated or may not be provided with reference numerals (e.g., a spring, gasket, etc.).

The valve body 120 includes an inlet 121 and an outlet 122 through which fluid is configured to flow through the electronic valve 100. At one end of the valve body 120, an interior of the valve body 120 includes threads 123 configured to receive and engage with a lifter 300. An interior of the valve body 120 is substantially hollow in order to receive the lifter 300. The valve body 120 may include a plurality of holes 131, for example, two holes 131 configured to receive a pin 130. The pin 130 is configured to limit the translation of a lifter 300, thereby preventing the lifter 300 from being accidentally or unintentionally removed from the valve body 120 or from being over-tightened and damaging the solenoid portion 110, 210. Operation of the lifter 300 and the pin 130 will be discussed in further detail below. At the other end of the valve body 120, the valve body 120 is configured to receive and engage with the solenoid portion 110, such that some components of the solenoid portion 110 may be disposed within the valve body 120, while other components of the solenoid portion 110 may protrude from the valve body 120. Other components of the valve body 120 that may be present in the electronic valve 100 may not be illustrated or may not be provided with reference numerals (e.g., o-ring, screws, etc.).

Figure 23:
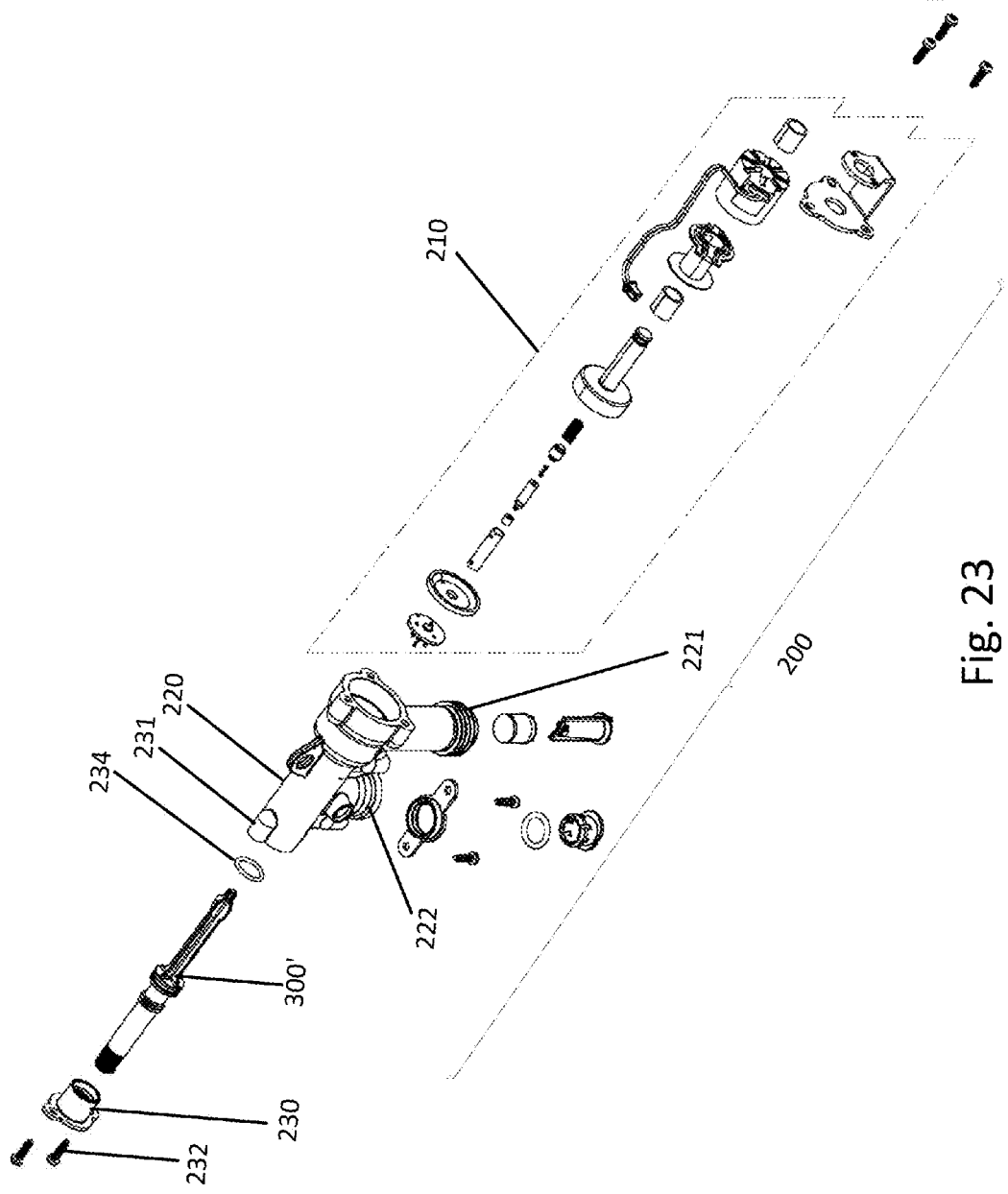
FIG. 23 is an exploded perspective view of an electronic valve of the faucet of FIG. 1 and a lifter for manually overriding the electronic valve, shown according to another exemplary embodiment.
Figure 24:
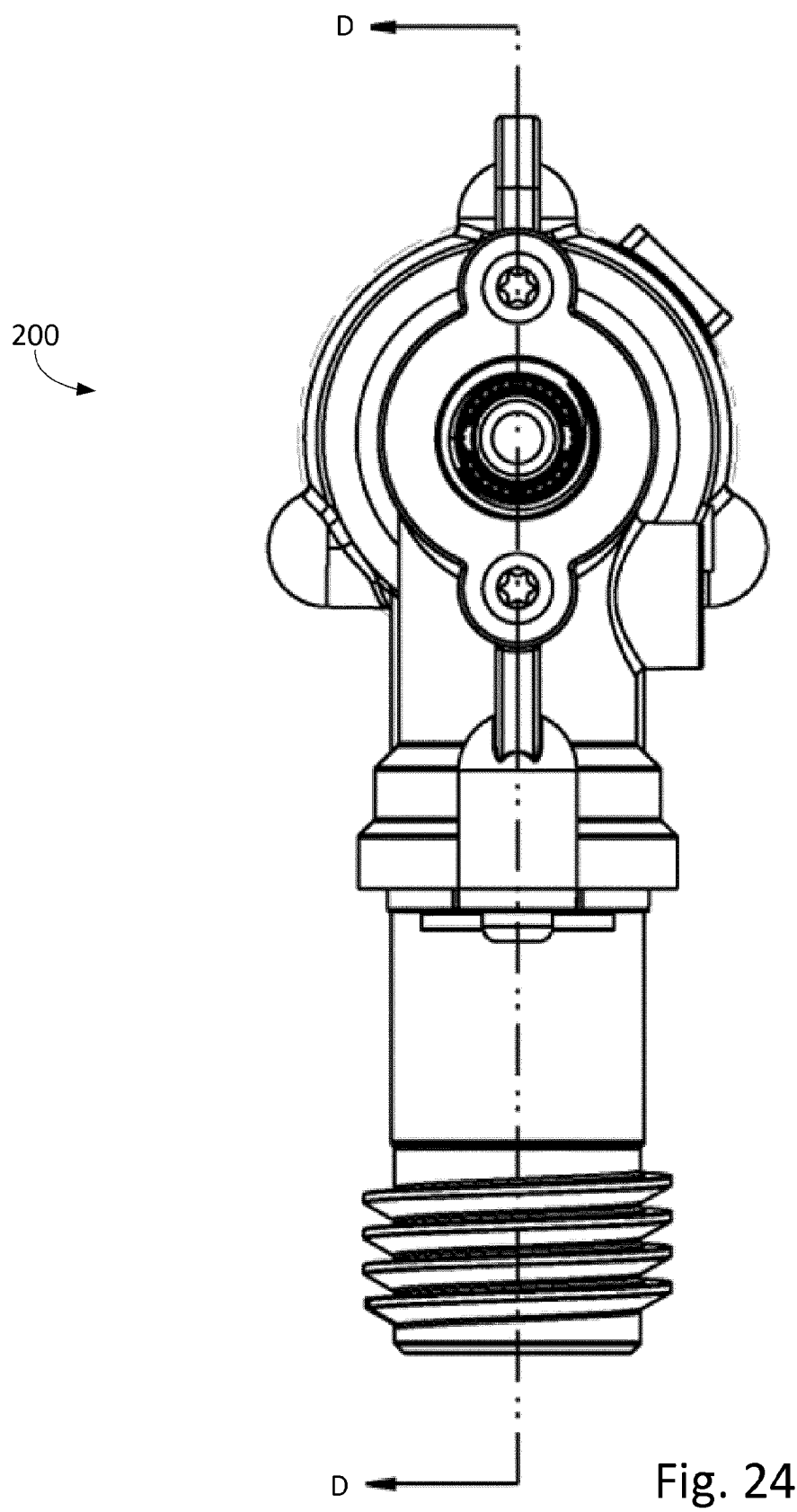
FIG. 24 is a left elevation view of the solenoid operated valve of FIG. 23.
Figure 25:
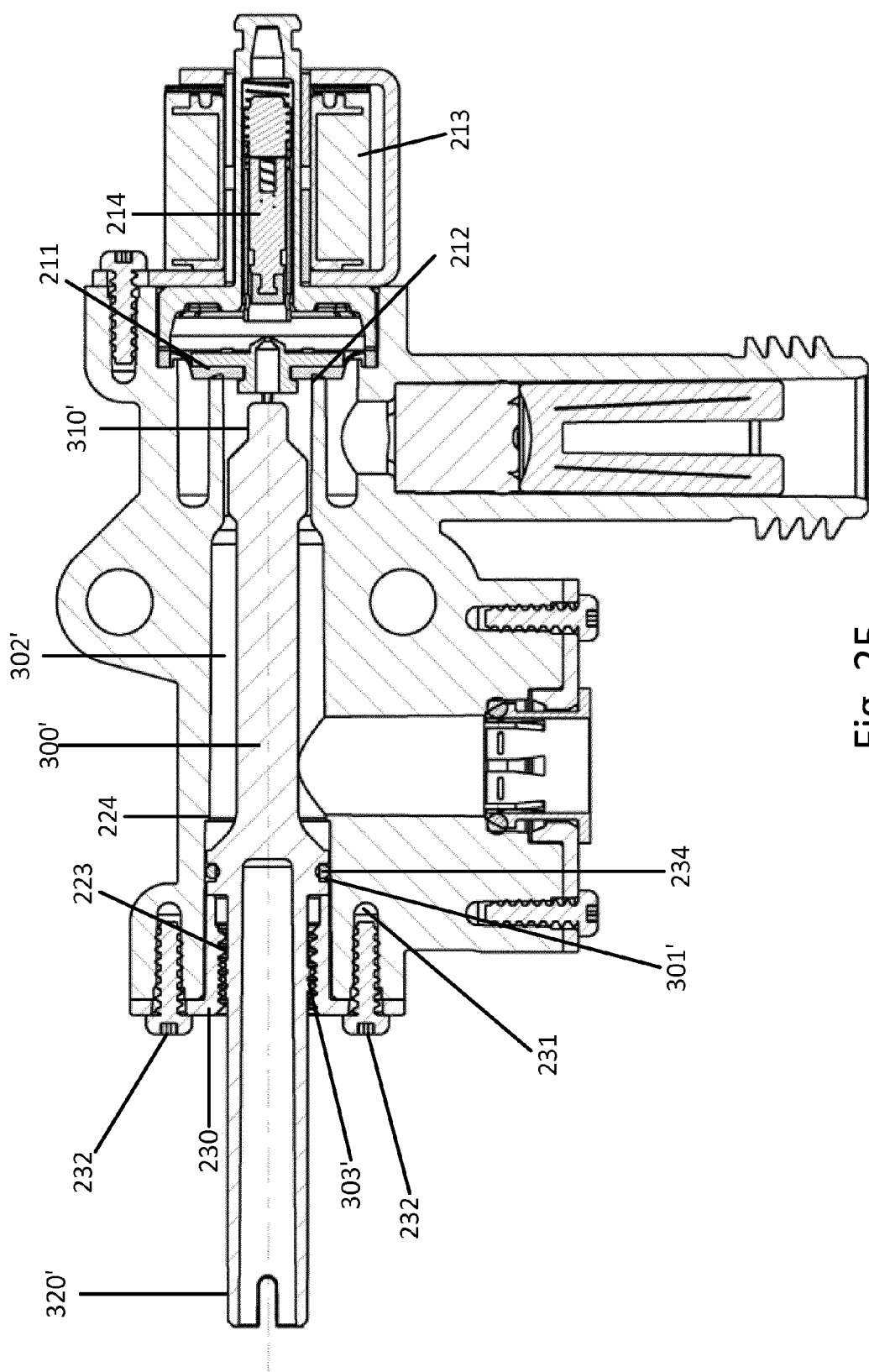
FIG. 25 is a front, cross-sectional elevation view of the electronic valve through a line D-D of FIG. 24.
Figure 26:
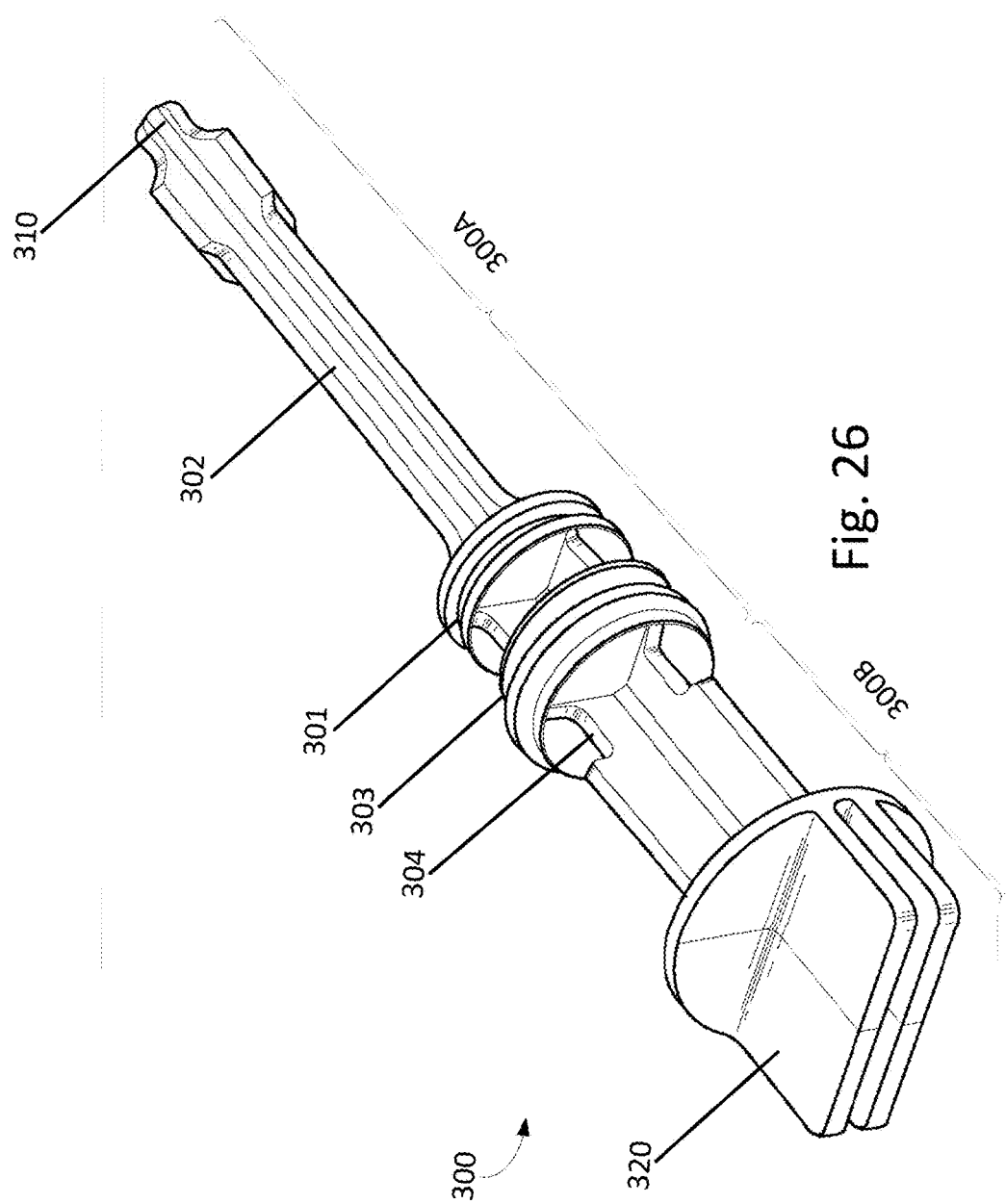
FIG. 26 is a perspective view of the lifter of FIG. 19.
Figure 27:
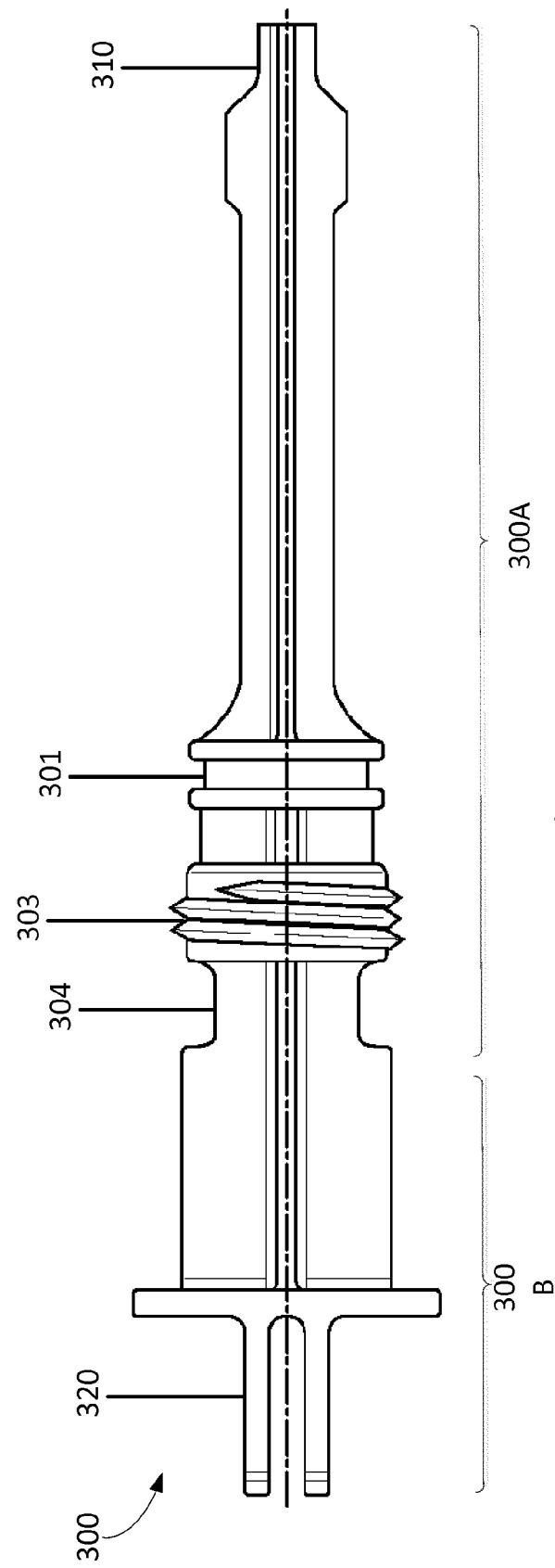
FIG. 27 is a front elevation view of the lifter of FIG. 26.

Referring now to FIGS. 23-25, a second exemplary embodiment of the electronic valve 200 is provided. The components and operation of the electronic valve 200 is substantially the same as the components and operation of the electronic valve 100, except that the electronic valve 200 does not include the pin 130 and the plurality of holes 131 configured to receive the pin 130 in the valve body 120. Instead, the electronic valve 200 includes a threaded cap 230 secured to a plurality of holes 231 disposed in the valve body 120 by a plurality of screws 232. Similar to the pin 130, the threaded cap 230 is configured limit the translation of the lifter 300, thereby preventing the lifter 300 from being accidentally or unintentionally removed from the valve body 220. Operation of the lifter 300 and the threaded cap 230 will be discussed in further detail below. Same or equivalent components as the first exemplary embodiment of the electronic valve 100 are given references numbers increased by 100 in FIGS. 23-25, which illustrate the second exemplary embodiment of the electronic valve 200.

Before describing the lifter 300 in detail, it should be noted that the lifter 300 of the electronic valve 100 (see, e.g., FIGS. 19-22) and the lifter 300' of the electronic valve 200 (see, e.g., FIGS. 23-25) include similar elements (e.g., o-ring grooves 301, 301', tips 310, 310', handles 320, 320', etc.). For clarity, the lifter 300' and components thereof of the electronic valve 200 are indicated with a prime (′). However, for the purposes of this disclosure, lifter 300 may be used specifically to refer to the lifter 300 of the electronic valve 100, or generically to refer to both of the lifter 300 of the electronic valve 100 and the lifter 300' of the electronic valve 200. One of skill in the art, upon reviewing the description and figures of this disclosure will recognize the similarities and differences of the lifter 300 and lifter 300', components thereof, and their interactions with the electronic valve 100 and electronic valve 200, respectively. Accordingly, a lifter 300 may be used in conjunction with either or both the electronic valve 100 and the electronic valve 200.

Referring now to FIGS. 19, 20, 26, and 27, an exemplary embodiment of the lifter 300 is provided. In the exemplary embodiment, the lifter 300 is a manually threaded device. In other embodiments, the lifter may be replaced, for example, with cams or mechanical linkages. Although the exemplary embodiment of the lifter 300 is manufactured in a single piece, in alternative embodiments the lifter 300 may be manufactured in a plurality of pieces coupled together by any known method, for example, by an adhesive, fasteners, etc. The lifter 300 is preferably formed of plastic. In other embodiments, the lifter 300 may be formed of any suitable material, for example, brass, stainless steel, or ceramic. The lifter 300 may be any color, such as a bright color to distinguish the lifter 300 from other components of the electronic valve 100, 200 or the faucet 10. Making the handle 320 of the lifter 300 a bright color or contrasting color to the rest of the electronic valve 100, 200, may draw a user's attention to the handle 320, facilitating location and identification in low-light conditions (e.g., under a countertop, in a cabinet, or during a power outage). In addition, the lifter may be transparent, translucent or opaque.

The lifter 300 includes a first section 300A configured to be received by and engaged with the valve body 120, 220 and a second section 300B configured to be exposed from the end of the valve body 120, 220 that is not engaged with the solenoid portion 110, 210. The lifter 300 includes an o-ring groove 301 and threads 303. The o-ring groove 301 is configured to receive and engage with an o-ring 134, 234 (see FIGS. 19 and 23) to seal the lifter 300 in the valve body 120, 220 to prevent the electronic valve 100, 200 from leaking. In one embodiment, threads 303 are configured to engage with threads 123 on the interior surface of the valve body 120. In another embodiment, threads 303' are configured to engage with threads 223 of the threaded cap 230. The threaded cap 230 will be described in further detail below. In the electronic valve 100, the first section 300A is defined at one end by a tip 310 and at the other end by a recess 304, adjacent to the threads 303 and configured to engage with the pin 130. The second section 300B of the lifter 300 is defined at one end by either the recess 304 or the threads 303, respectively, and at the other end by a handle 320.

The handle 320 of the second section 300B of the lifter 300 is shaped to facilitate easy manual operation. In a preferred embodiment, the handle 320 is formed of two flat, parallel surfaces with a space in between the two surfaces. Thus, the user can manually operate the lifter 300 by placing two fingers, one on each surface, on the flat parallel surfaces of the handle 320 and rotating the lifter 300 in a desired direction. Alternatively, the user can manually operate the lifter 300 by placing a flat-head screwdriver or other flat, lever-type device within the space between the parallel surfaces and rotating the screwdriver or lever-type device in the desired direction.

Referring now to FIGS. 21 and 25-30, the tip 310 of the first section 300A is formed at an opposite end of the lifter 300 than the handle 320. The tip 310 is configured to engage with the sealing element 111, 211. Operation of the tip 310 will be discussed in further detail below.

In an embodiment of the electronic valve 100, when the lifter 300 is not in use (hereafter "normal operation"), the lifter 300 is inserted into the hollow portion of the valve body 120 and the threads 303 of the lifter 300 are threaded or partially threaded to the threads 123 of the valve body 120. As used herein, "partially threaded" refers to a position in which some, but not all, of the threads 303 are engaged with the threads 123. In other words, the lifter 300 may be further threaded to engage more of the threads between the lifter 300 and the valve body 120. The pin 130 is inserted through the holes 131 disposed in the valve body 120. The pin 130 rests within the recess 304 of the lifter 300. The pin 130 interacts with surface ends (e.g., shoulders, ledges, etc.) defining the recess 304 to stop or limit translation of the lifter 300. That is, the pin 130 prevents over-tightening of the lifter 300 and prevents unintentional removal of the lifter 300.

Referring to the embodiment of FIG. 25, during normal operation of the electronic valve 200, the threaded cap 230 is placed over the lifter 300' until the threaded cap 230 abuts an exterior of the valve body 220. In this configuration, the threaded cap 230 and the lifter 300' are coaxial. Holes disposed in the threaded cap 230 are aligned with the holes 231 disposed in the valve body 220 and secured by the screws 232. The threads 303' of the lifter 300' are threaded or partially threaded to the threads 223 of the threaded cap 230. The threaded cap 230 prevents unintentional removal of the lifter 300'. A step 224 (e.g., shoulder, ledge, etc.) in the valve body 220 prevents over-tightening of the lifter 300' and damage to the solenoid portion 210.

During normal operation, the tip 310 does not engage with the sealing element 111, 211 as the lifter 300 is not completely threaded, and thus, not completely inserted into the hollow portion of the valve body 120, 220 (see FIGS. 28 and 29).

In normal operation, the electronic valve 100, 200 may be in the open position or the closed position. When the electronic valve 100, 200 is in the closed position (see, e.g., FIG. 28), the solenoid coil 113, 213 does not produce a magnetic field. In this configuration, the pilot vent hole is blocked by the plunger 114, 214, causing inlet pressure to pass through the second vent hole and push the sealing element 111, 211 onto the sealing surface 112, 212. In other words, the sealing element 111, 211 abuts an entire length (e.g., an annular circumference) of the sealing surface 112, 212 preventing the flow of fluid through the electronic valve 100, 200. Because fluid cannot flow from the inlet 121, 221 of the valve body 120, 220 to the outlet 122, 222 of the valve body 120, 220, fluid is not provided to the faucet spout 1.

When the electronic valve 100, 200 is in the open position (see, e.g., FIG. 29), the solenoid coil 113, 213 produces a magnetic field that draws the plunger 114, 214 towards the solenoid coil 113, 213. When plunger 114, 214 moves towards the solenoid coil 113, 213, the plunger 114, 214 opens the pilot vent hole in the sealing element 111, 211. In this configuration, pressure that was holding the sealing element 111, 211 onto the sealing surface 112, 212 is reduced, allowing inlet pressure to push the sealing element 111, 211 off of the sealing surface 112, 212. As a result, the sealing element 111, 211 no longer abuts an entire length of the sealing surface 112, 212 and fluid may flow between the sealing element 111, 211 and the sealing surface 112, 212. Because fluid can flow from the inlet 121, 221 of the valve body 120, 220 to the outlet 122, 222 of the valve body 120, 220 fluid is provided to the faucet spout 1 if the handle 3 is in the operational mode.

If the electronic valve 100, 200 is in the open position and the handle 3 is in operational mode, fluid can flow through the valve body 120, 220 from the inlet 121, 221 to the outlet 122, 222 despite the lifter 300 being inserted into the valve body. This is because in an exemplary embodiment, the lifter 300 has a cross-shaped cross-section defined by a plurality of passages 302 that extend along a length of the lifter 300 in at least the first section 300A (see FIGS. 21 and 26). In other embodiments, the lifter 300 may have other shaped cross-sections, provided that the lifter 300 contains one or more passages that allow for fluid flow.

In the event that power failure renders the electronic valve 100, 200 inoperable, the lifter 300 may be rotated clockwise to place the lifter 300 in "override operation". As the lifter 300 is rotated clockwise, the threads 303 advance the lifter 300 into the valve body 120, 220. During override operation (see, e.g., FIG. 30), the lifter 300 is fully inserted/threaded into the valve body 120, 220 such that the tip 310 engages with the sealing element 111, 211 and pushes the sealing element 111, 211. When the sealing element 111, 211 is pushed, the sealing element 111, 211 is lifted from the sealing surface 112, 212 and fluid may flow from the inlet 121, 221 to the outlet 122, 222 of the valve body 120, 220 through passages 302 of the lifter 300. When power is restored, the lifter 300 may be rotated counterclockwise to disengage the tip 310 from the sealing element 111, 211 and place the lifter 300 in normal operation.

Although the description of the embodiments provided herein utilizes the lifter in the context of a solenoid operated valve located in a faucet, one of ordinary skill in the art would understand that the lifter may be utilized to manually override a solenoid operated valve located in any other device. Therefore, operation of the lifter is not limited to use in faucets.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the faucets, sensors and sensor holders as shown and/or described in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A faucet configured for touchless actuation, comprising:
   a faucet body;
   a mechanical valve that is disposed in a portion of the faucet body and is movable between an open state and a closed state;
   a member that at least partially surrounds a cylindrical outer surface of the mechanical valve and reciprocates in a radial direction relative to the outer surface of the mechanical valve between an open position and a closed position in response to operation of the mechanical valve between the open state and the closed state, wherein the radial direction is normal to a longitudinal axis of the outer surface of the mechanical valve;
   an electronic valve that is movable between an open state and a closed state; and
   a system that detects and communicates a state of the faucet in response to the position of the member.

2. The faucet of claim 1, wherein the mechanical valve and the electronic valve are fluidly coupled in series.

3. The faucet of claim 1, wherein the system comprises a switch supported proximate the mechanical valve such that the switch is actuated in response to the member moving between the closed position and the open position.

4. The faucet of claim 3, wherein the switch is supported by a ring disposed at least partially around the mechanical valve.

5. The faucet of claim 3, further comprising an annunciator that indicates to a user the state of the faucet in response to actuation of the switch, wherein when the mechanical valve is in the closed state, the annunciator is in an off state, and when the mechanical valve is in the open state, the annunciator is in an on state.

6. The faucet of claim 5, further comprising a sensor operatively coupled to the electronic valve, wherein triggering of the sensor causes the electronic valve to move between the open state and the closed state.

7. The faucet of claim 6, further comprising a processing electronics configured to, in response to detecting the mechanical valve is in the closed state:
   place the annunciator in the off state;
   place the electronic valve in the closed state; and
   turn off the sensor.

8. The faucet of claim 7, wherein in response to detecting the mechanical valve is in the open state, the processing electronics is configured to:
   place the annunciator in the on state;
   place the electronic valve in the open state; and
   turn on the sensor.

9. The faucet of claim 3, wherein the switch is disposed between a contact surface of the mechanical valve and a contact surface of a control member, the switch is open when the switch does not contact at least one contact surface, and the switch is closed when the switch contacts both contact surfaces.

10. A faucet, comprising:
    a body;
    an electronic valve for pausing and resuming a flow of fluid through the body;
    a mechanical valve for controlling the flow of fluid from a source to the electronic valve, the mechanical valve including a contact surface;
    a control member disposed at least partially around the mechanical valve and having a contact surface; and
    a switch disposed between the contact surfaces of the mechanical valve and the control member, wherein the switch is open when the switch does not contact at least one contact surface and the switch is closed when the switch contacts both contact surfaces;

wherein the control member reciprocates in a radial direction relative to the contact surface of the mechanical valve to open and close the switch, wherein the radial direction is normal to a longitudinal axis of an outer surface of the mechanical valve.

11. The faucet of claim 10, wherein the control member reciprocates relative to the contact surface of the mechanical valve in response to the movement of a control stem of the mechanical valve.

12. The faucet of claim 11, wherein the mechanical valve further includes a valve member disposed within the mechanical valve, and the valve member transfers motion from the control stem to the control member to translate the control member by adjusting a radial position of the control member relative to the contact surface of the mechanical valve.

13. The faucet of claim 12, further comprising an adjustment member, wherein the valve member transfers motion from the control stem to the adjusting member, which in turn transfers motion to the control member to open and close the switch.

14. The faucet of claim 12, wherein valve member is located directly above or below the switch along the longitudinal axis of the mechanical valve.

15. The faucet of claim 12, wherein the valve member is orientated diametrically opposite from the switch.

16. The faucet of claim 12, wherein the mechanical valve includes a body having an opening therein, and wherein the valve member includes a portion that moves within the opening to adjust the radial position of the control member through an adjuster.

17. The faucet of claim 10, further comprising a circuit mounted on the control member between the switch and the control member, wherein the circuit includes the contact surface of the control member.

18. The faucet of claim 17, wherein the circuit comprises an annunciator that indicates to a user the state of the faucet in response to actuation of the switch, wherein when the mechanical valve is in the closed position, the annunciator is in an off state, and when the mechanical valve is in the open position, the annunciator is in an on state.

19. The faucet of claim 9, wherein the control member moves relative to the contact surface of the mechanical valve to open and close the switch.

20. The faucet of claim 19, wherein the control member surrounds the mechanical valve and moves radially in response to radial movement of the member of the mechanical valve.

* * * * *

UNITED STATES PATENT AND TRADEMARK OFFICE
CERTIFICATE OF CORRECTION

PATENT NO. : 9,822,902 B2
APPLICATION NO. : 14/791009
DATED : November 21, 2017
INVENTOR(S) : Esche et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 130 days.

Signed and Sealed this
Twenty-fifth Day of September, 2018

Andrei Iancu
*Director of the United States Patent and Trademark Office*